(12) United States Patent
Hoshii et al.

(10) Patent No.: US 8,174,730 B2
(45) Date of Patent: May 8, 2012

(54) PRINTING CONTROL DEVICE, PRINTING SYSTEM AND PRINTING CONTROL PROGRAM

(75) Inventors: Jun Hoshii, Nagano (JP); Takashi Ito, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 722 days.

(21) Appl. No.: 12/317,593

(22) Filed: Dec. 22, 2008

(65) Prior Publication Data

US 2009/0185231 A1    Jul. 23, 2009

(30) Foreign Application Priority Data

Dec. 21, 2007  (JP) .................................. 2007-330783
Dec. 1, 2008   (JP) .................................. 2008-306355

(51) Int. Cl.
 *H04N 1/40*  (2006.01)
(52) U.S. Cl. ......................................... 358/2.1; 358/504
(58) Field of Classification Search .................. 358/1.9, 358/2.1, 400, 406, 500, 504, 3.24–3.26, 468
See application file for complete search history.

(56) References Cited

U.S. PATENT DOCUMENTS

| 7,379,588 | B2 * | 5/2008 | Loce et al. .................... 382/166 |
| 2003/0098896 | A1 | 5/2003 | Berns et al. | |

FOREIGN PATENT DOCUMENTS

| JP | 2007-3885344 | 8/1999 |
| JP | 2005-508125 | 3/2005 |
| JP | 2006082460 A | 3/2006 |
| WO | WO-03/039134 | 5/2003 |
| WO | 2006101193 A1 | 9/2006 |

OTHER PUBLICATIONS

U.S. Appl. No. 12/317,594—Non-Final Office Action dated Sep. 29, 2011.

* cited by examiner

*Primary Examiner* — Thomas D Lee
*Assistant Examiner* — Stephen M Brinich
(74) *Attorney, Agent, or Firm* — Nutter McClennen & Fish LLP; Michael P. Visconti, III; John J. Penny, Jr.

(57) ABSTRACT

In Step S230, an ICM P3a1 calculates an ink amount set $\phi$ capable of reproduction of the same spectral reflectivity $R(\lambda)$ as a target spectral reflectivity $R_t(\lambda)$ indicated by a spectral reflectivity data RD. An ECM P3a3 multiplies a weight function $w(\lambda)$ obtained by adding the color-matching functions $x(\lambda)$, $y(\lambda)$, and $z(\lambda)$ in respective wavelengths, when calculating a mean square error of a difference $D(\lambda)$ between the target spectral reflectivity $R_t(\lambda)$ indicated by the spectral reflectivity data RD and an estimation spectral reflectivity $R_s(\lambda)$ as an evaluation value $E(\phi)$. In addition, the ink amount set $\phi$ is calculated as an optimum solution for minimizing the evaluation value $E(\phi)$.

8 Claims, 28 Drawing Sheets

FIG. 7

INDEX TABLE

| INDEX | DISPLAYING RGB | SPECTRAL REFLECTIVITY DATA (TARGET SPECTRAL REFLECTIVITY)[nm] | | | | | | |
|---|---|---|---|---|---|---|---|---|
| | | λ=300 | 310 | 320 | 330 | 340 | 350 | ... |
| 00000 | 20, 15, 125 | 0 | 0 | 0 | 0 | 0 | 0 | ... |
| 00001 | 84, 33, 15 | 0 | 0.05 | 0.05 | 0.1 | 0.1 | 0.11 | ... |
| 00002 | 200, 42, 125 | 0 | 0 | 0 | 0 | 0 | 0.03 | ... |
| 00003 | 70, 128, 125 | 0 | 0 | 0 | 0 | 0 | 0 | ... |

FIG. 12

1D-LUT

| INDEX | INK AMOUNT SET<br>C, M, Y, K, lc, lm |
|---|---|
| 00000 | 3, 21, 5, 10, 33, 53 |
| 00001 | 84, 56, 120, 15, 87, 51 |
| 00002 | 204, 42, 12, 3, 1, 0 |
| 00003 | 120, 150, 11, 10, 31, 32 |
| ⋮ | ⋮ |

FIG. 17
(A) SPECTRAL NEUGEBAUER MODEL
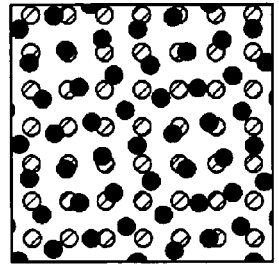 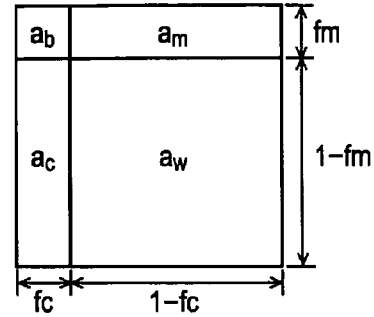
$R(\lambda) = a_w R_w(\lambda) + a_c R_c(\lambda) + \cdots + a_k R_k(\lambda)$
$a_w = (1-f_c)(1-f_m)(1-f_y)$
$a_c = f_c(1-f_m)(1-f_y)$
$a_m = (1-f_c)f_m(1-f_y)$
$a_y = (1-f_c)(1-f_m)f_y$
$a_r = (1-f_c)f_m f_y$
$a_g = f_c(1-f_m)f_y$
$a_b = f_c f_m(1-f_y)$
$a_k = f_c f_m f_y$
(B) MURRAY DAVIS MODEL
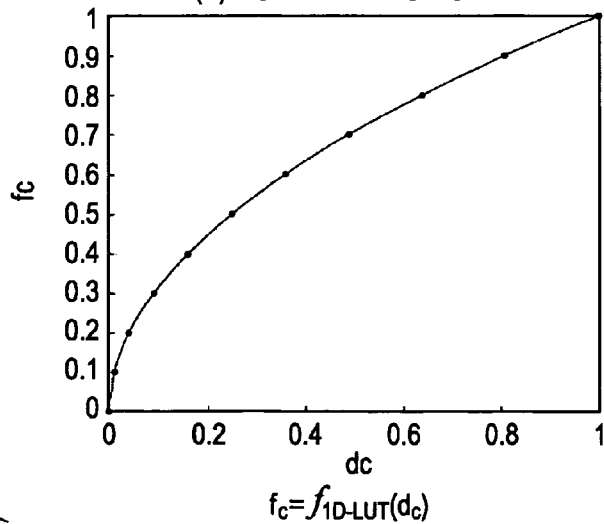
$f_c = f_{\text{1D-LUT}}(d_c)$ FIG. 19
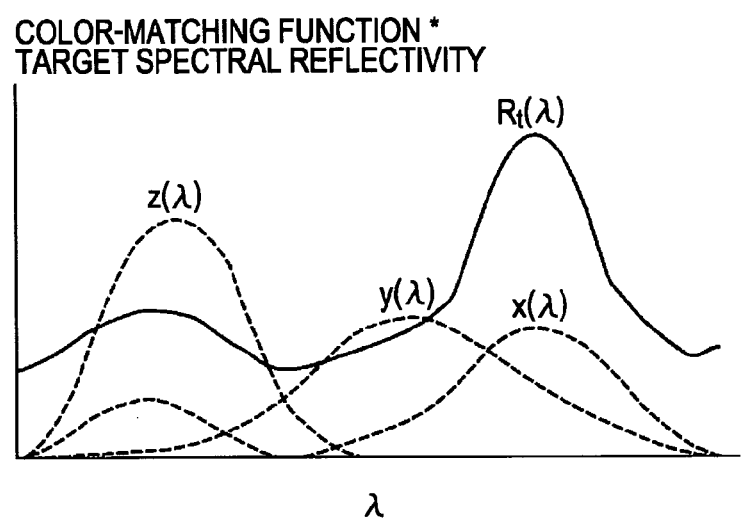
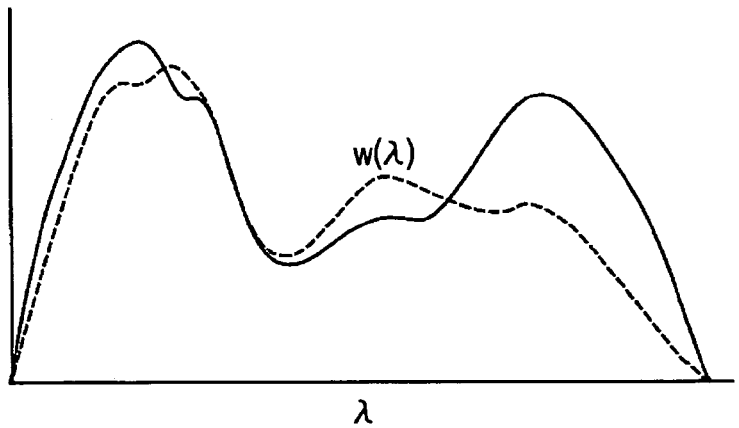
- - - - - - $w(\lambda) = x(\lambda) + y(\lambda) + z(\lambda)$
———— $w(\lambda) = c_x x(\lambda) + c_y y(\lambda) + c_z z(\lambda)$ FIG. 20
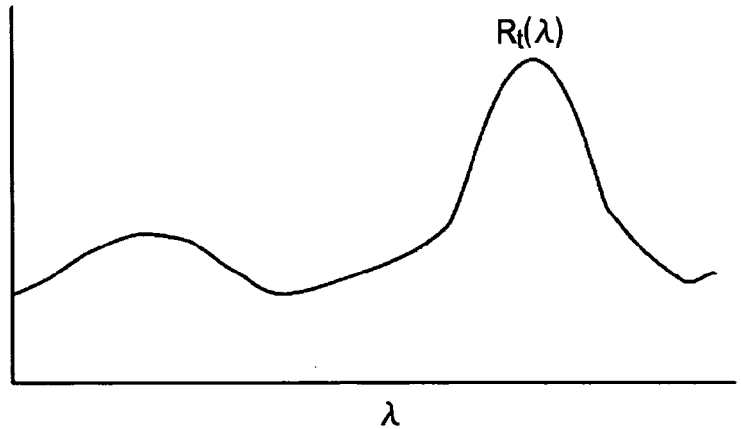
COLOR-MATCHING FUNCTION *
TARGET SPECTRAL REFLECTIVITY
$R_t(\lambda)$
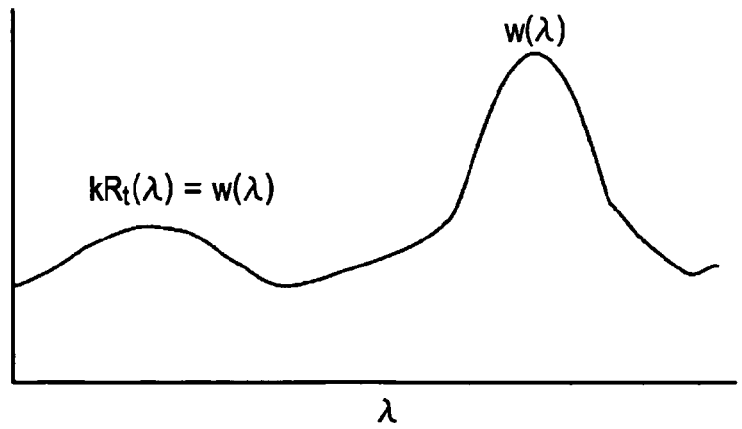
WEIGHTING FUNCTION
$w(\lambda)$
$kR_t(\lambda) = w(\lambda)$

PRINTING CONTROL DEVICE, PRINTING SYSTEM AND PRINTING CONTROL PROGRAM

BACKGROUND

1. Technical Field

The present invention relates to a printing control device, a printing system, and a printing control program, and particularly to a printing control apparatus, a printing system, and a printing control program capable of reproducing a target.

2. Related Art

A printing method paying attention to spectral reproduction was suggested (see Patent Document 1). In Patent Document 1, a combination of printer colors (CMYKOG) is optimized so as to fit with a spectral reflectivity (target spectrum) of a target by use of a printing model, in order to perform printing so as to accord with a target image in terms of a spectrum and a measurement color. By performing the printing on the basis of the printer colors (CMYKOG) in this manner, the target image can be reproduced in terms of spectrum. As a result, it is possible to obtain a print result of high reproduction in terms of the measurement color.

[Patent Document 1] JP-A-2005-508125

However, kinds of color materials such as ink usable in a printing apparatus such as a printer are finite and it is difficult to exactly reproduce the spectral reflectivity of a target in a visible wavelength region. Accordingly, since the fitting of the spectral reflectivity is sometimes insufficient, a problem occurs in that colors are insufficiently reproduced. In particular, since the fitting of the spectral reflectivity was intended up to the wavelength region which rarely contributes to human visibility, reproduction precision of the spectral reflectivity deteriorates even in a wavelength region which considerably contributes to the human visibility. Therefore, a problem occurs in that a human feels that the visible reproduction precision is poor.

SUMMARY

Accordingly, it is an object of the present invention to provide a printing control device, a printing control method, and a print control program capable of ensuring both spectral reproduction and visible reproduction.

In order to solve the problems mentioned above, a target spectral reflectivity acquiring unit acquires spectral reflectivity of a target as a target spectral reflectivity. A printing control unit acquires the color material amount set corresponding to the target spectral reflectivity with reference to a lookup table defining a correspondence relation between the color material amount set and the target spectral reflectivity, and printing control unit designates the color material amount set to the printing apparatus to perform the printing. In the lookup table, the correspondence relation between the color material amount set and a target color value having high approximation to the spectral reflectivity reproduced on the print medium when the color material amount set is designated to the printing apparatus to perform the printing is defined. In addition, a different weight is added depending on a wavelength in evaluation of the approximation.

The target spectral reflectivity acquiring unit may acquire the target spectral reflectivity by actually measuring spectral reflectivity of the target or receives selection of the target spectral reflectivity from a user or the like. The printing apparatus capable of at least attaching the plural color materials onto the print medium can be used. In addition, the invention is applicable to various printing apparatuses such as an ink jet printer, a laser printer, and a sublimation printer.

As an example suitable for the weight, the weight may be set on the basis of a spectral sensitivity characteristic of human eyes. With such a configuration, the spectral reflectivity of a wavelength sensitive to the spectral sensitivity of a human can be preferably approximated. Then, a print result having excellent visual reproduction precision can be obtained. As a more specific example suitable for the weight, the weight is set on the basis of linear combination of color-matching functions corresponding to tristimulus. With such a configuration, it is possible to set the weight in which the wavelength region corresponding to the color-matching functions corresponding to the tristimulus is synthetically valued.

The weight may be set on the basis of the target spectral reflectivity. For example, since it is considered that in the wavelength region having a spectrum in which the target spectral reflectivity is strong, the approximation to the spectral reflectivity finally has a considerable influence on visibility, it is desirable that this wavelength region is preferably approximated. In addition, the weight may be set on the basis of a spectral energy distribution of a predetermined light source. By setting the weight on the basis of the spectral energy distribution of the predetermined light source, it is possible to preferably approximate the wavelength region having a spectrum in which the light source is strong. Moreover, it is possible to improve visual reproduction in this light source. In addition, by synthetically taking the reproduction both under a single light source and under the plural light source into consideration, the weight may be set on the basis of the linear combination of spectral energies of the plural light sources.

The technical spirit of the invention can be embodied as a method as well as a specific printing control apparatus. That is, the invention can be embodied by the method including steps corresponding to constituent units of the printing control apparatus described above. Of course, when the printing control apparatus described above reads a program to execute the constituent units described above, the technical spirit of the invention can be embodied even in the program executing functions corresponding to the constituent units or various record media recording the program. In addition, the printing control apparatus according to the invention may be a single apparatus and may be present in plural apparatuses in a distribution manner. For example, each of constituent units included in the printing control apparatus may be distributed both to a printer driver executed in a personal computer and a printer. The constituent units of the printing control apparatus according to the invention can be included in the printing apparatus such as a printer.

BRIEF DESCRIPTION OF THE DRAWINGS

FIG. 7 is a diagram illustrating an index table.

FIG. 12 is a diagram illustrating a 1D-LUT.

FIG. 17 is a diagram illustrating a spectral neugebauer model.

FIG. 19 is a schematic diagram illustrating a weight function according to a modified example.

FIG. 20 is a schematic diagram illustrating a weight function according to a modified example.

BRIEF DESCRIPTION OF THE CODE

10: COMPUTER
11: CPU
12: RAM
13: ROM
14: HDD
15: GIF
16: VIF
17: IIF
18: BUS
P1: OS
P1a: GDI
P1b: SPOOLER
P2: APL
P2a: UIM
P2b: MCM
P2c: PDG
P3b: PDV
P3a1: ICM
P3a2: RPM
P3a3: ECM
P3a4: LOM
P4: MDV
P5: DDV

DESCRIPTION OF EXEMPLARY EMBODIMENTS

Hereinafter, an embodiment of the invention will be described in the following order:

1. Configuration of Printing Control Device,
2. Print Data Generating Process,
3. Printing Control Process,
3-1. D-LUT Generating Process,
3-2. Printing Control Data Generating Process,
4. Spectral Printing Model,
5. Modified Examples,
5-1. Modified Example 1,
5-2. Modified Example 2,
5-3. Modified Example 3,
5-4. Modified Example 4,
5-5. Modified Example 5,
5-6. Modified Example 6,
5-7. Modified Example 7, and
5-8. Modified Example 8.

1. Configuration of Printing Control Apparatus

Figure 1:
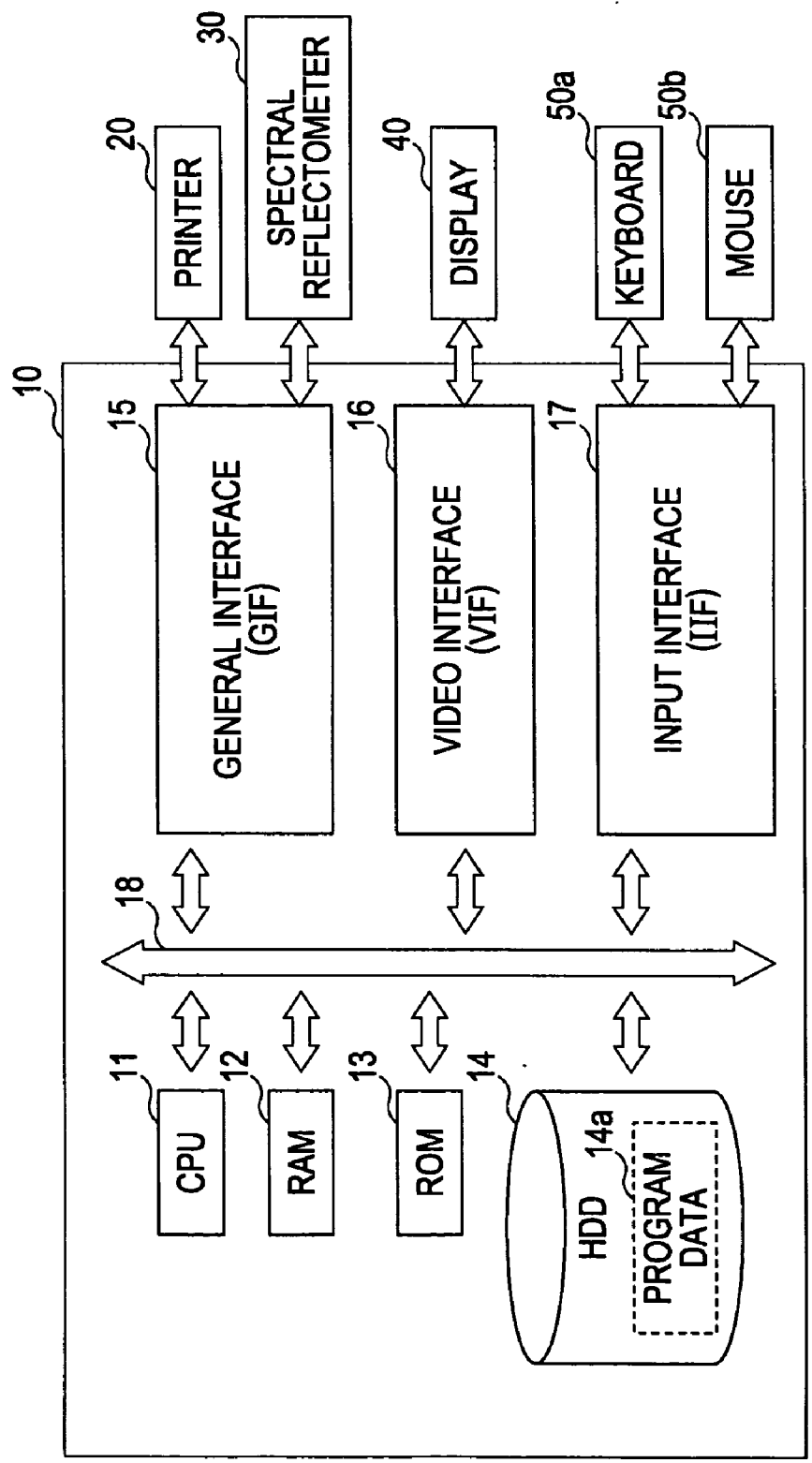
FIG. 1 is a block diagram illustrating the hardware configuration of a printing control device.

FIG. 1 is a diagram illustrating the hardware configuration of a printing control apparatus according to an embodiment of the invention. In the drawing, the printing control apparatus is configured mainly by a computer 10. The computer 10 includes a CPU 11, a RAM 12, a ROM 13, a hard disk drive (HDD) 14, a general interface (GIF) 15, a video interface (VIF) 16, an input interface (IIF) 17, and a bus 18. The bus 18 is a unit which carries out data communication between the constituent units 11 to 17 included in the computer 10, and the data communication is controlled by a chip set (not shown) or the like. The HDD 14 stores program data 14a executing various programs in addition to an operating system (OS). Therefore, the CPU 11 executes calculating according to the program data 14a while loading the program data 14a on the RAM 12. The GIF 15 is an interface conforming to a USB standard, for example and connects an external printer 20 and a spectral reflectometer 30 to the computer 10. The VIF 16 connects the computer 10 to an external display 40, and provides an interface for displaying an image on the display 40. The IIF 17 connects the computer 10 to an external keyboard 50a and a mouse 50b, and provides an interface for allowing the computer 10 to acquire input signals from the keyboard 50a and the mouse 50b.

Figure 2:
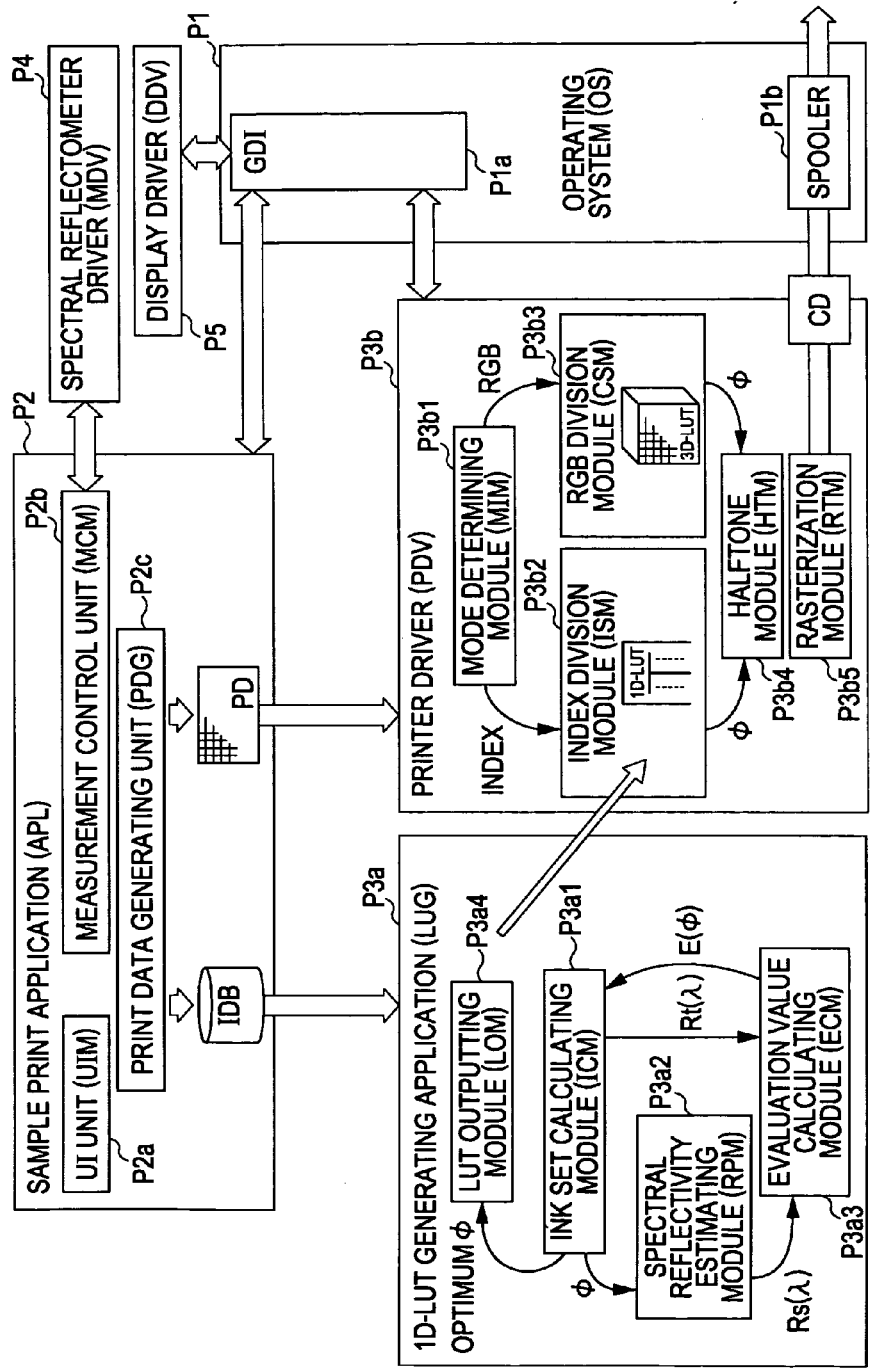
FIG. 2 is a block diagram illustrating the software configuration of the printing control apparatus.

FIG. 2 is a diagram illustrating the software configuration of programs executed in the computer 10 along with an overall flow of data. In the drawing, the computer 10 mainly executes an OS P1, a sample print application (APL) P2, a 1D-LUT generating application (LUG) P3a, a printer driver (PDV) P3b, a spectral reflectometer driver (MDV) P4, and a display driver (DDV) P5. The OS P1 is one of APIs in which each program is usable and includes an image apparatus interface (GDI) P1a and a spooler P1b. Therefore, the GDI P1a is called by request of the APL P2, and additionally the PDV P3b or the DDV P5 is called by request of the GDI P1a. The GDI P1a has a general configuration in which the computer 10 controls image output of an image output apparatus such as the printer 20 and the display 40. One of the PDV P3b and the DDV P5 provides a process inherent in the printer 20 or the display 40. The spooler P1b executes a job control or the like through the APL P2, the PDV P3b, or the printer 20. The APL P2 is an application program for printing a sample chart SC and generates print data PD having an RGB bitmap format to output the print data PD to the GDI P1a. When the APL P2 generates the print data PD, the APL P2 acquires color measurement data MD of a target from the MDV P4. The MDV P4 controls the spectral reflectometer 30 by request of the APL P2 and outputs the spectral reflectivity data RD obtained by the control to the APL P2.

The print data PD generated by the APL P2 is output to the PDV P3b through the GDI P1a or the spooler P1b. The PDV P3b generates printing control data CD which can be output to the printer 20 on the basis of the print data PD. The printing control data CD generated by the PDV P3b is output to the printer 20 through the spooler P1b included in the OS P1, and the sample chart SC is printed on a print sheet by allowing the printer 20 to operate on the basis of the printing control data CD. An overall process flow has been described. Hereinafter, processes executed by the programs P1 to P4 will be described in detail with reference to a flowchart.

2. Print Data Generating Process

Figure 3:
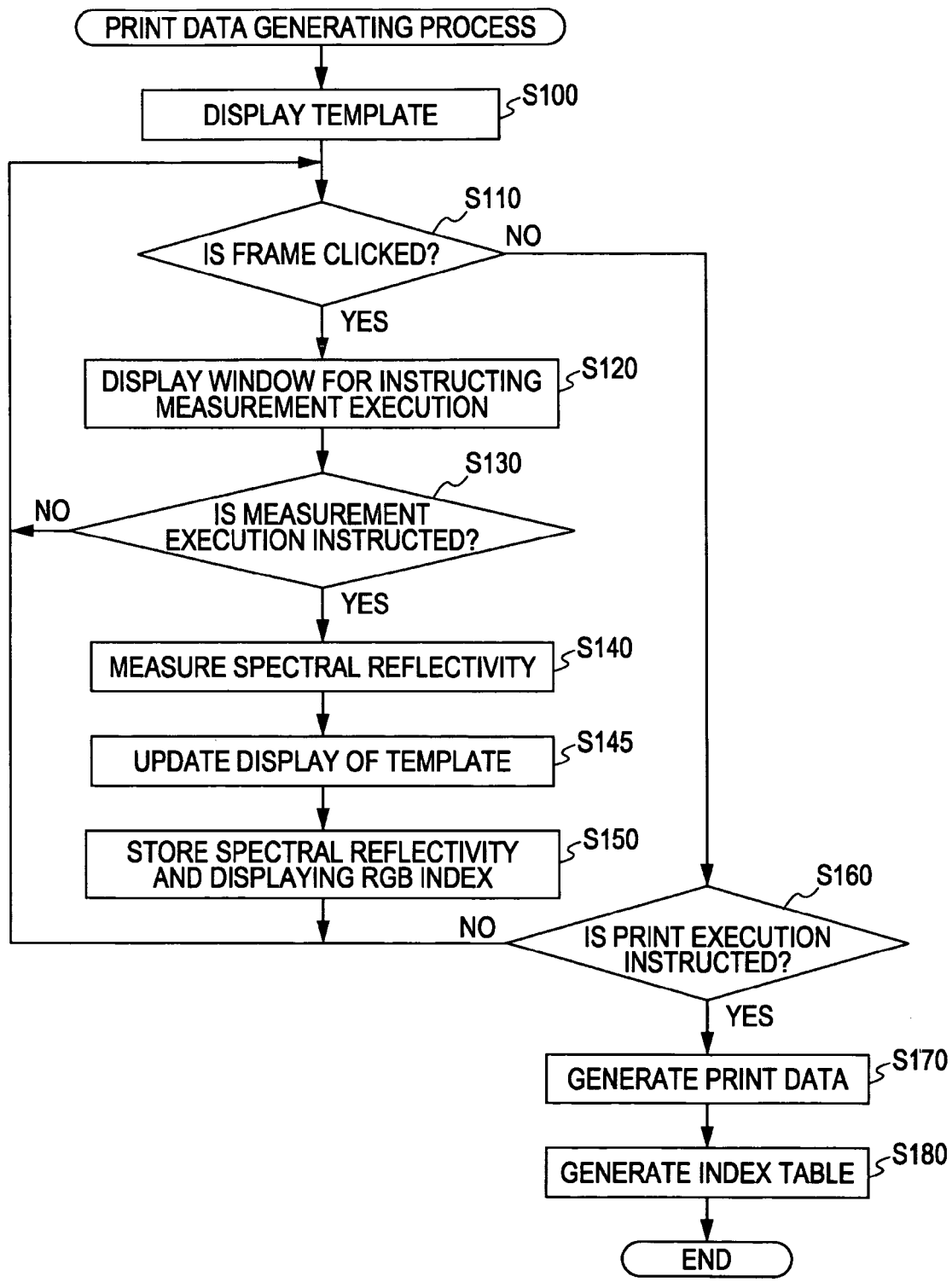
FIG. 3 is a flowchart illustrating a flow of print data generation process.

FIG. 3 is a flowchart illustrating a flow of print data generation executed by the APL P2. As shown in FIG. 2, the APL P2 includes a UI unit (UIM) P2a, a measurement control unit (MCM) P2b, and a print data generating unit (PDG) P2c. The UIM P2a, the MCM P2b, and the PDG P2c execute steps shown in FIG. 3. In Step S100, the UIM P2a allows the GDI P1a and the DDV P5 to display a UI screen for receiving a print command instructing the sample chart SC to be printed. The UI screen is provided with a display showing a template of the sample chart SC.

Figure 4:
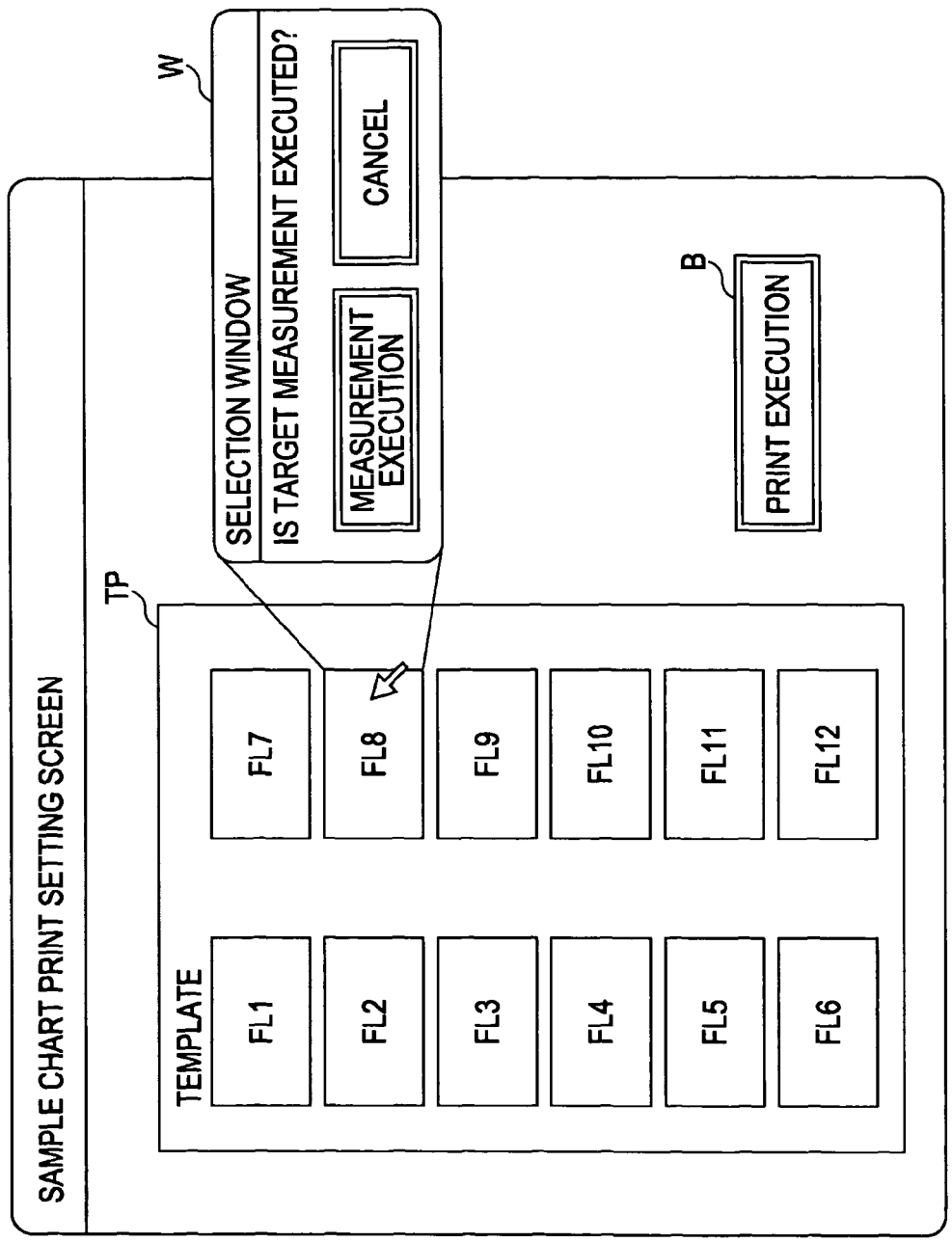
FIG. 4 is a diagram illustrating an example of a UI screen.

FIG. 4 is a diagram illustrating an example of the UI screen. In the drawing, a template TP is displayed. The template TP is provided with twelve frames FL1 to FL12 for laying out color patches. Each of the frames FL1 to FL12 can be selected on the UI screen by click of the mouse 50b. Upon clicking each of the frames FL1 to FL12, a selection window W used to instruct whether to start measurement of spectral reflectivity is displayed. In addition, the UI screen is also provided with a button B used to instruct whether to execute print of the sample chart SC. In Step S110, click of each of the frames FL1 to FL12 by the mouse 50b detected is on the UIM P2a. When the click is detected, the window W used to instruct whether to start the measurement of the spectral reflectivity is displayed in Step S120. In Step S130, click by the mouse 50b is detected on the selection window W. When a cancel is clicked, the step returns to Step S110. Alternatively, when a measurement execution of the spectral reflectivity is clicked, the MCM P2b allows the spectral reflectometer 30 to measure a target spectral reflectivity $R_t(\lambda)$ as a spectral reflectivity $R(\lambda)$ of the target TG through the MDV P4 and acquires the spectral reflectivity data RD storing the target spectral reflectivity $R_t(\lambda)$ in Step S140.

When the measurement of the target spectral reflectivity $R_t(\lambda)$ is completed in Step S140, a color value (L*a*b* value) in a CIELAB color space upon radiating a D65 light source as the most standard light source is calculated. In addition, the L*a*b* value is converted into an RGB value by use of a predetermined RGB profile and the RGB value is acquired as a displaying RGB value. The RGB profile is a profile which defines a color matching relation between the CIELAB color space as an absolute color space and the RGB color space in this embodiment. For example, an ICC profile is used.

Figure 5:
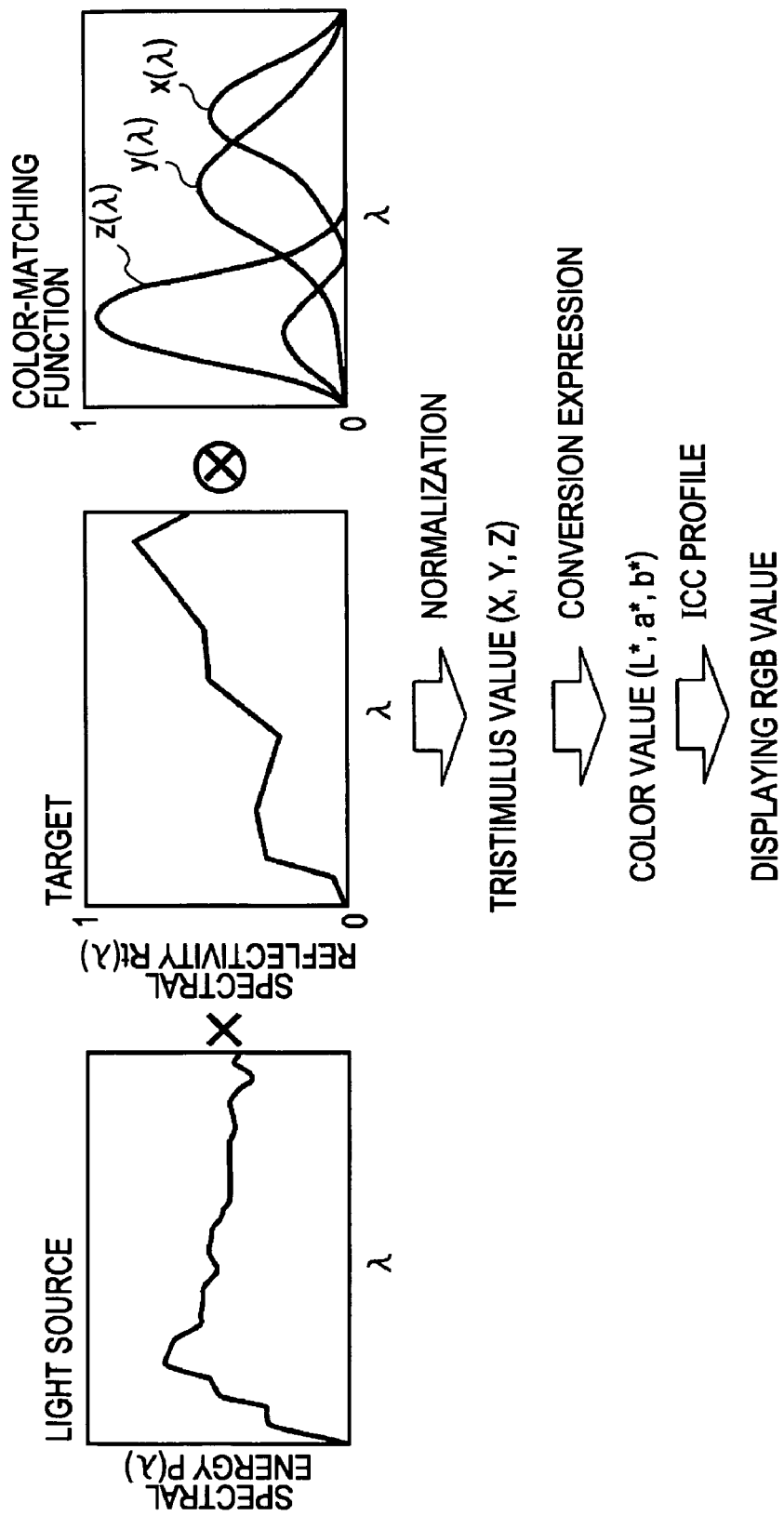
FIG. 5 is an explanatory diagram illustrating calculation for a color value on the basis of spectral reflectivity.

FIG. 5 is a schematic diagram illustrating calculation of the displaying RGB value from the spectral reflectivity data RD in Step S140. When the target spectral reflectivity $R_t(\lambda)$ of the target TG is measured, the spectral reflectivity data RD expressing a distribution of the target spectral reflectivity $R_t(\lambda)$ illustrated in the drawing is obtained. In addition, the target TG means a surface of an object which is a target of spectral reproduction. For example, the target TG is a surface of an artificial object or a natural object formed by another printing apparatus or a coating apparatus. On the other hand, the D65 light source has a distribution of non-uniform spectral energy $P(\lambda)$ in a visible wavelength region shown in the drawing. In addition, spectral energy of reflected light of each wavelength obtained when the D65 light source is radiated to the target TG is a value obtained by a product of the target spectral reflectivity $R_t(\lambda)$ and the spectral energy $P(\lambda)$ in each wavelength. In addition, tristimulus values X, Y, and Z are obtained by a convolution integral of color-matching functions $x(\lambda)$, $y(\lambda)$, and $z(\lambda)$ replied to a spectral sensitivity characteristic of a human for a spectrum of the spectral energy of reflected light and by normalization for a coefficient k. When the above description is expressed an expression, Expression (1) is obtained as follows:

[Expression 1].

$$X = k \int P(\lambda) R_t(\lambda) x(\lambda) d\lambda$$

$$Y = k \int P(\lambda) R_t(\lambda) y(\lambda) d\lambda$$

$$Z = k \int P(\lambda) R_t(\lambda) z(\lambda) d\lambda \qquad (1)$$

By converting the tristimulus values X, Y, and Z by a predetermined conversion expression, it is possible to obtain an L*a*b* value indicating a color formed when the D65 light source is radiated to the target TG. Additionally, by using an RGB profile, it is possible to obtain the displaying RGB value. In Step S145, each of the frames FL1 to FL12 clicked on the template TP is updated to a display colored by the displaying RGB value. In this way, the color of the target TG in the D65 light source which is a standard light source can be grasped sensuously on the UI screen. When Step S145 is completed, a proper index is generated and stored in the RAM 12 in Step S150, by allowing the index, location information of the frames FL1 to FL12 clicked in Step S110, and the displaying RGB value to correspond to the spectral reflectivity data RD. When Step S150 is completed, the process returns to Step S110 and Steps S120 to S150 are repeatedly executed. Therefore, another of the frames FL1 to FL12 is selected and the target spectral reflectivity $R_t(\lambda)$ of the another target TG can be measured for the another of the frames FL1 to FL12.

In this embodiment, twelve different targets TG1 to TG12 are prepared and the target spectral reflectivity $R_t(\lambda)$ for each of the targets TG1 to TG12 is obtained as the spectral reflectivity data RD. Therefore, in Step S150, data obtained in correspondence with the spectral reflectivity data RD for each of the frames FL1 to FL12 and the proper index are sequentially stored in the RAM. In addition, each value of the index may be generated so as to become a proper value, an increment value, or a random value without repetition.

When a click of each of the frames FL1 to FL12 is not detected in Step S110, a click of a button B instructing print execution of the sample chart SC is detected in Step S160. When the click of the button B is not detected, the process returns to Step S110. Alternatively, when the click of the button B instructing the print execution of the sample chart SC is detected, the PDG P2c generates the print data PD in Step S170.

Figure 6:
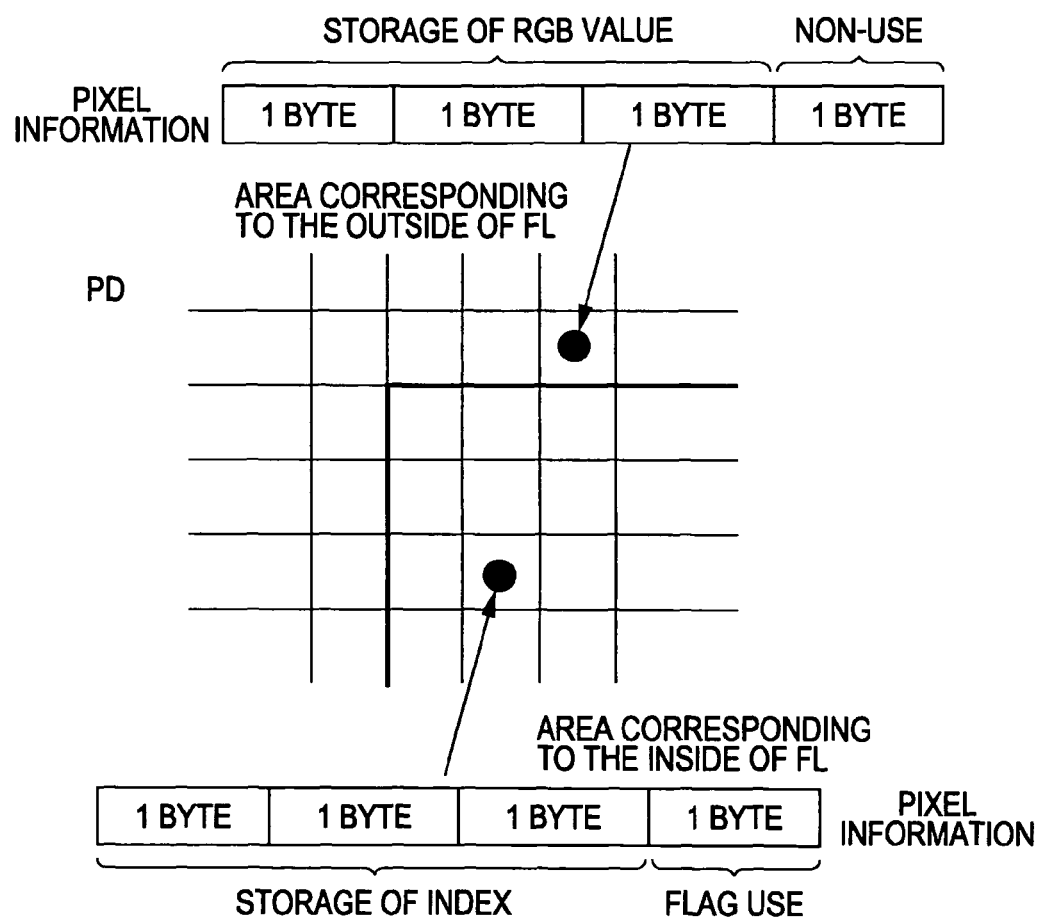
FIG. 6 is a diagram illustrating print data.

FIG. 6 is a schematic diagram illustrating the configuration of the print data PD. In the drawing, the print data PD is constituted by numerous pixels arranged in a dot matrix shape and each pixel has 4-byte (8 bits×4) information. The print data PD expresses the same image as that of the template TP shown in FIG. 4. Pixels other than pixels of areas corresponding to the frames FL1 to FL12 of the template TP have the RGB value corresponding to the template TP. A gray scale value of each channel of RGB is expressed by eight bits (256 gray scales) and three bytes of the four bytes described above are used to store the RGB value. For example, when a color outside the frames FL1 to FL12 of the template TP is displayed with an intermediate gray such as (R, G, B)=(128, 128, 128), the pixels outside the areas corresponding to the frames FL1 to FL12 in the print data PD have color information of (R, G, B)=(128, 128, 128). In addition, the one remaining byte is not used.

On the other hand, the pixels of the areas corresponding to the frames FL1 to FL12 of the template TP have 4-byte information. Normally, an index is stored using three bytes with which the RGB value is stored. The index is proper to each of the frames FL1 to FL12 generated in Step S150. The PDG P2c acquires the index from the RAM 12 and stores an index corresponding to the pixels of each of the frames FL1 to FL12. A flag indicating that the index is stored using the one remaining byte is set for the pixels corresponding to each of the frames FL1 to FL12 in which the index is stored instead of the RGB value. In this way, it is possible to know whether each pixel stores the RGB value and whether each pixel stores the index. In this embodiment, since three bytes are used in order to store the index, it is necessary to generate an index which can be expressed with information of three or less bytes in Step S150. When the print data PD having a bitmap format can be generated in this manner, the PDG P2c generates an index table IDB in Step S180.

FIG. 7 is a diagram illustrating an example of the index table IDB. In the drawing, the target spectral reflectivity $R_t(\lambda)$ obtained by measurement and the displaying RGB value corresponding to the L*a*b* value in the D65 light source are stored in each of the proper indexes generated in correspondence with the frames FL1 to FL12. When the generation of the index table IDB is completed, the print data PD is out the PDV P3b via the GDI P1a or the spooler P1b. Since the print data PD formally has the same format as a general RGB bitmap format, the print data PD can also be processed like a general printing job even by the GDI P1a or the spooler P1b supplied by the OS P1. On the other hand, the index table IDB is output directly to the PDV P3b. In this embodiment, the index table IDB is newly generated. However, a new correspondence relation among the index, the target spectral reflectivity $R_t(\lambda)$, and the displaying RGB value is added to the existing index table IDB. In addition, it is not necessary to successively the print data generating process described above and a printing control process described below in the same apparatus, but the print data generating process and the printing control process may be individually performed in a plurality of computers connected to each other through a communication line such as an LAN or the Internet.

3. Printing Control Process

Figure 8:
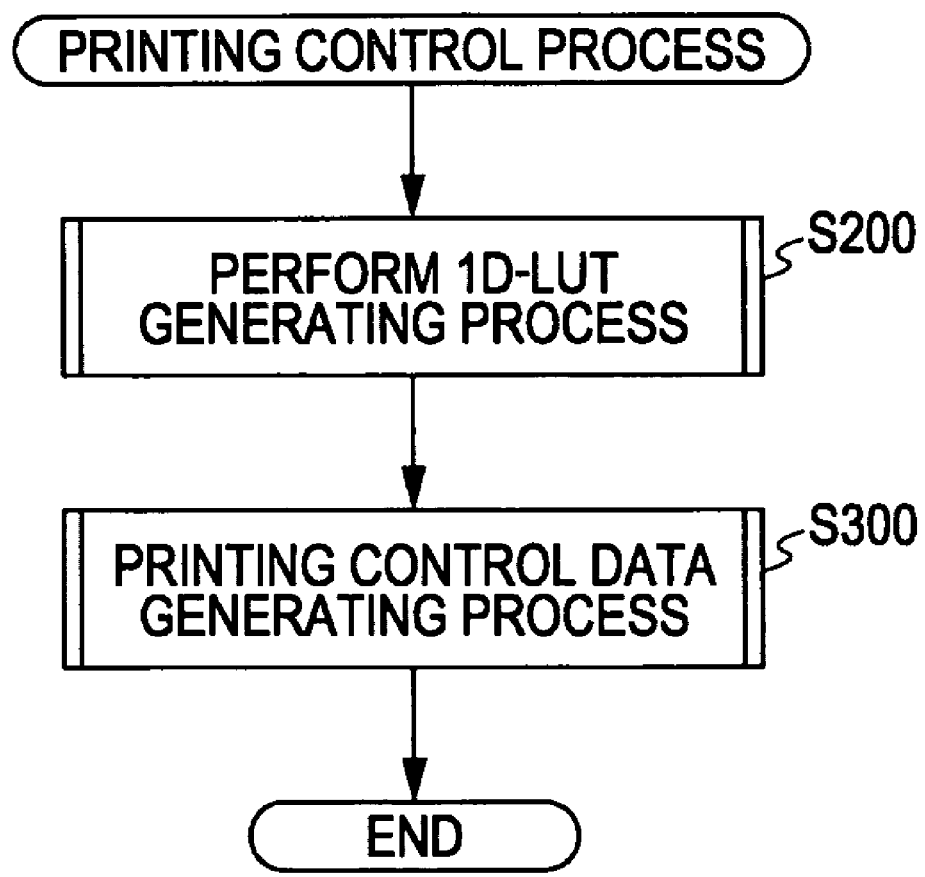
FIG. 8 is a flowchart of an overall flow of a printing control process.

FIG. 8 is a flowchart illustrating an overall flow of the printing control process performed by the LUG P3a and the PDV P3b. A 1D-LUT generating process (Step S200) is performed by the LUG P3a and a printing control data generating process (Step S300) is performed by the PDV P3b. The 1D-LUT generating process may be performed before the printing control data generating process or the 1D-LUT generating process and the printing control data generating process may be performed together.

3-1. 1D-LUT Generating Process

Figure 9:
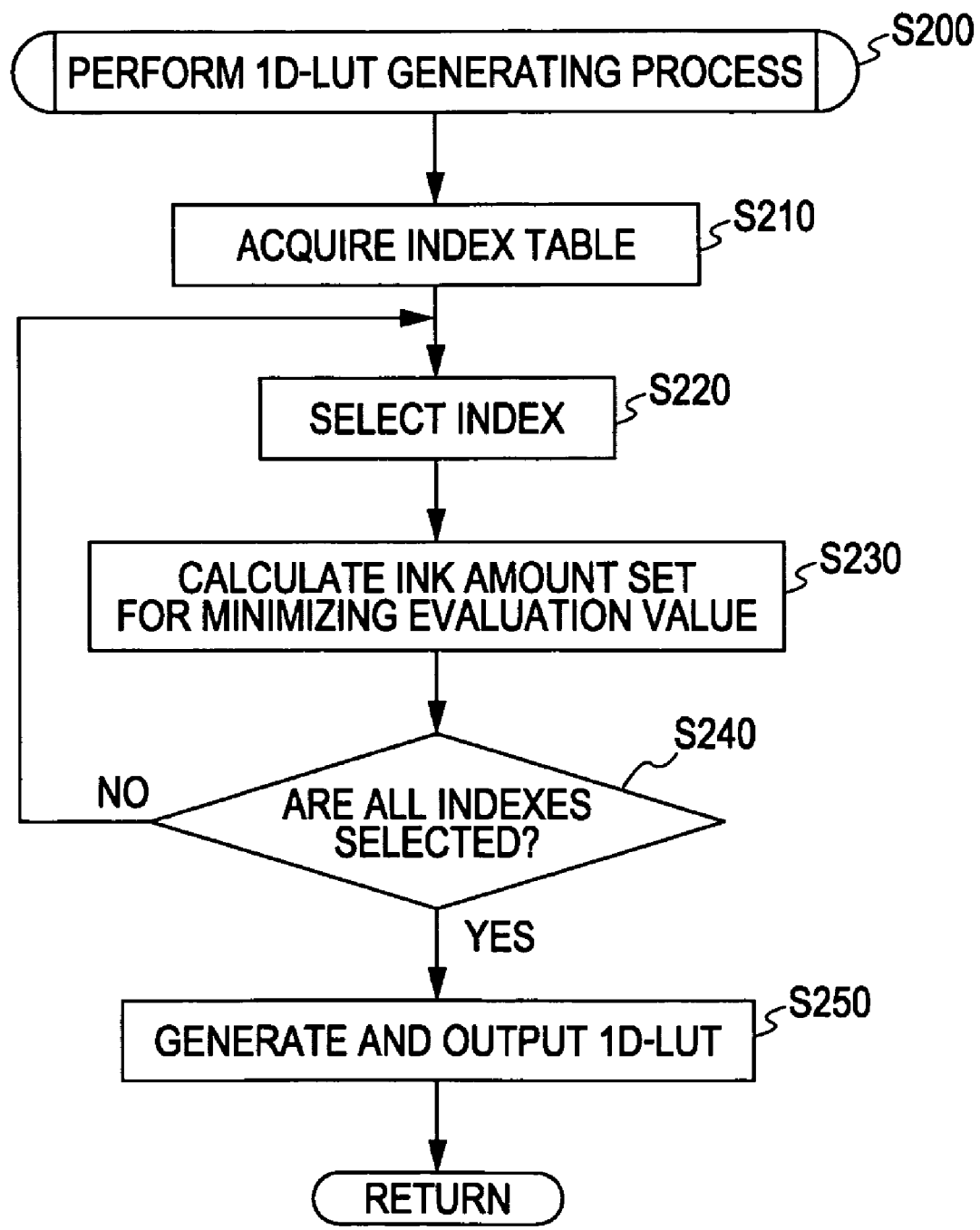
FIG. 9 is a flowchart of a flow of a 1D-LUT generating process.

FIG. 9 is a flowchart illustrating a flow of the 1D-LUT generating process. The LUG P3a shown in FIG. 2, includes an ink amount set calculating module (ICM) P3a1, a spectral reflectivity estimating module (RPM) P3a2, an evaluation value calculating module (ECM) P3a3, and an LUT outing module (LOM) P3a4. In Step S210, the ICM P3a1 acquires the index table IDB. In Step S220, one of indexes is selected from the index table IDB and the spectral reflectivity data RD corresponding to the selected index is acquired. In Step S230, the ICM P3a1 calculates an ink amount set in which the spectral reflectivity R ($\lambda$) which is the same as the target spectral reflectivity $R_t(\lambda)$ indicated by the spectral reflectivity data RD is reproducible. At this time, the RPM P3a2 and the ECM P3a3 described above are used.

Figure 10:
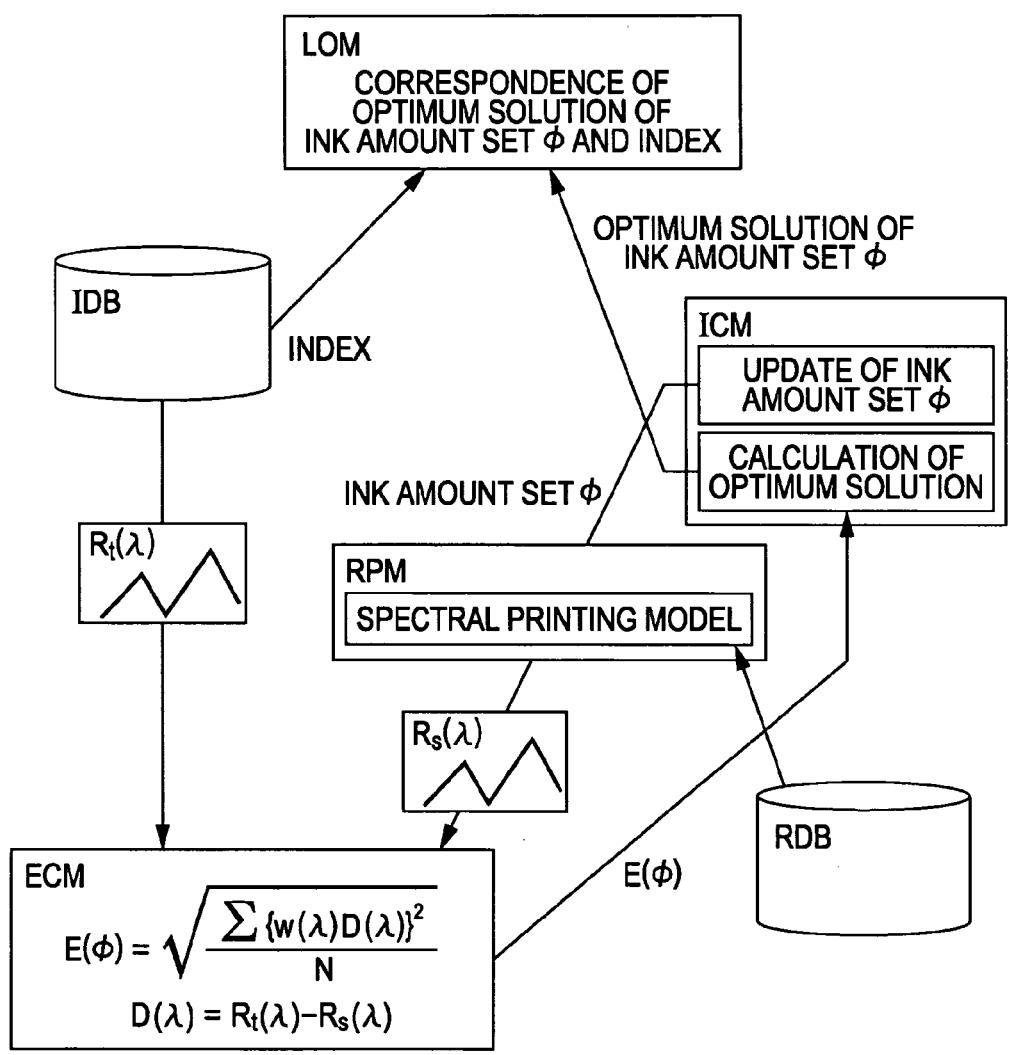
FIG. 10 is a schematic diagram illustrating a flow of a process of optimizing an ink amount set.

FIG. 10 is a schematic diagram illustrating the calculation flow of the ink amount set in which the spectral reflectivity R ($\lambda$) which is the same as the target spectral reflectivity $R_t(\lambda)$ indicated by the spectral reflectivity data RD is reproducible. The RPM P3a2 estimates the spectral reflectivity R ($\lambda$) obtained when the printer 20 ejects ink onto a predetermined print sheet on the basis of an ink amount set φ upon inputting the ink amount set φ from the ICM P3a1, and outputs the spectral reflectivity R ($\lambda$) as an estimation spectral reflectivity $R_s(\lambda)$ to the ECM P3a3.

The ECM P3a3 calculates a difference D ($\lambda$) between the target spectral reflectivity $R_t(\lambda)$ indicated by the spectral reflectivity data RD and the estimation spectral reflectivity $R_s(\lambda)$, and multiplies the difference D ($\lambda$) by a weight function w ($\lambda$) of a weight and each wavelength $\lambda$. A square root of a root mean square of this value is calculated as an evaluation value E (φ). When the above calculation is expressed as an expression, Expression (2) is obtained as follows:

[Expression 2]

$$E(\phi) = \sqrt{\frac{\sum \{w(\lambda)D(\lambda)\}^2}{N}} \qquad (2)$$

$$D(\lambda) = R_t(\lambda) - R_s(\lambda).$$

In Expression (2), N indicates a finite division number of a wavelength $\lambda$. In Expression (2), a difference between the target spectral reflectivity $R_t(\lambda)$ and the estimation spectral reflectivity $R_s(\lambda)$ becomes smaller, as the evaluation value E (φ) is smaller. That is, as the evaluation value E (φ) is smaller, a spectral reflective R ($\lambda$) reproduced in a print medium when the printer 20 performs printing in accordance with the input ink amount set φ can be said to approximate to the target spectral reflectivity $R_t(\lambda)$ obtained from the corresponding target TG. Additionally, according to Expression (1) described above, it can be known that an absolute color value, which is expressed by the target TG corresponding to a print medium when the printer 20 performs printing on the basis of the ink amount set φ in accordance with variation in a light source, varies in both the target spectral reflectivity $R_t(\lambda)$ and the estimation spectral reflectivity $R_s(\lambda)$, but when the spectral reflective R ($\lambda$) approximate to the target spectral reflectivity $R_t(\lambda)$, a relatively same color is perceived regardless of the variation in the light source. Accordingly, according to the ink amount set φ in which the evaluation value (φ) becomes small, it is possible to obtain a print result that the same color as that of the target TG is perceived in all light sources.

In this embodiment, the weight function w ($\lambda$) uses Expression (3) as follows:

[Expression 3].

$$w(\lambda)=x(\lambda)+y(\lambda)+z(\lambda) \qquad (3)$$

In Expression (3), the weight function w ($\lambda$) is defined by adding color-matching functions x ($\lambda$), y ($\lambda$), and z ($\lambda$). By multiplying the entire right side of Expression (3) by a predetermined coefficient, a range of values of the weight function w (λ) may be normalized. According to Expression (1) described above, the color value (L*a*b* value) can be said to be considerably influenced, as the color-matching functions x (λ), y (λ), and z (λ) have a larger wavelength region. Accordingly, by using the weight function w (λ) obtained by adding the color-matching functions x (λ), y (λ), and z (λ), it is possible to obtain the evaluation value E (φ) capable of evaluating a square error in which the large wavelength region, which has considerable influence on a color, is valued highly. For example, the weight function w (λ) is zero in a near-ultraviolet wavelength region which cannot be perceived by human eyes. Therefore, in the near-ultraviolet wavelength region, the difference D (λ) does not contribute to an increase in the evaluation value E (φ).

That is, even though a difference between the target spectral reflectivity $R_t$ (λ) and the estimation spectral reflectivity $R_s$ (λ) in the entire visible wavelength region is not small, it is possible to obtain the evaluation value E (φ) having a small value, as long as the target spectral reflectivity $R_t$ (λ) and the estimation spectral reflectivity $R_s$ (λ) are similar to each other in a wavelength region which is perceived strongly by human eyes. Moreover, the evaluation value E (φ) can be used as an index of an approximate property of the spectral reflectivity R (λ) suitable for human eyes. The calculated evaluation value E (φ) returns to the ICM P3a1. That is, when the ICM P3a1 outputs an arbitrary ink amount set 4 to the RPM P3a2 and ECM P3a3, a final evaluation value E (φ) is configured to return to the ICM P3a1. The ICM P3a1 calculates an optimum solution of the ink amount set φ in which an evaluation value E (φ) as an object function is minimized, by repeatedly obtaining the evaluation value E (φ) in correspondence with an arbitrary ink amount set φ. As a method of calculating the optimum solution, a non-linear optimization method called a gradient method can be used.

Figure 11:
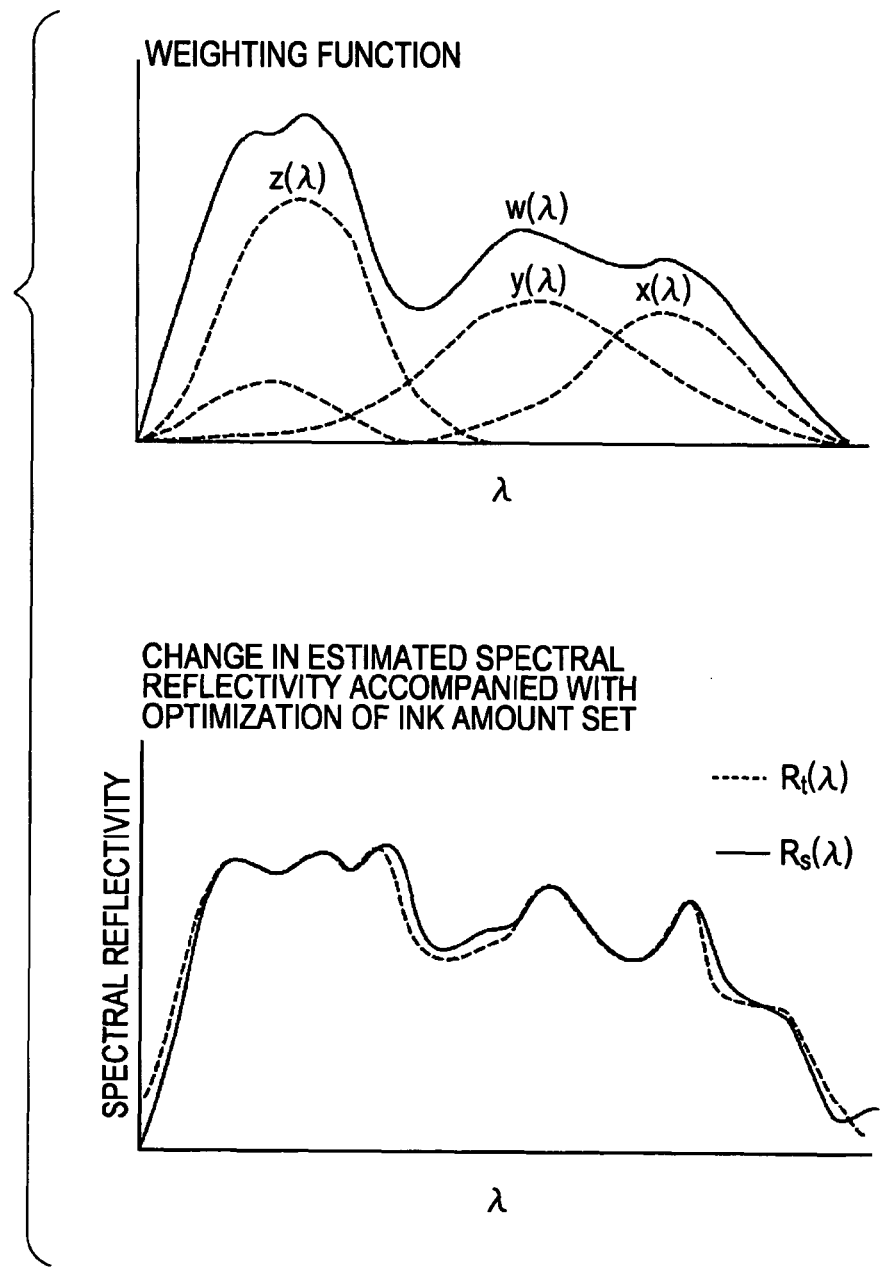
FIG. 11 is a schematic diagram illustrating optimized aspects of the ink amount set.

FIG. 11 is a schematic diagram illustrating optimization of the ink amount set φ in Step S230. In the drawing, the estimation spectral reflectivity $R_s$ (λ) obtained when printing is performed with the ink amount set φ approximates to the target spectral reflectivity $R_t$ (λ), as the ink amount set φ is optimized. Moreover, as the color-matching functions x (λ), y (λ), and z (λ) have a larger wavelength region by using the weight function w (λ), a restriction of the estimation spectral reflectivity $R_s$ (λ) to the target spectral reflectivity $R_t$ (λ) becomes stronger and a difference between the estimation spectral reflectivity $R_s$ (λ) and the target spectral reflectivity $R_t$ (λ) becomes smaller. Accordingly, since the estimation spectral reflectivity $R_s$ (λ) is restricted to the target spectral reflectivity $R_t$ (λ) of the target TG firstly for the large wavelength region of the color-matching functions x (λ), y (λ), and z (λ) which has considerable influence on view, it is possible to calculate the ink amount set φ apparently similar when an arbitrary light source is radiated. In this way, it is possible to the ink amount set φ capable of reproduction of an appearance similar to that of the target TG by printer 20 under any light source. In addition, a final condition of the optimization may be set to the repeated number of times of updating the ink amount set φ or a threshold value of the evaluation value E (φ).

In this way, when the ICM P3a1 calculates the ink amount set φ capable of reproduction of the spectral reflectivity R (λ) having the same appearance as that of the target TG in Step S230, it is determined in Step S240 whether all the indexes described in the index table IDB are selected in Step S220. When all the indexes are not selected, the process returns to Step S220 to select a subsequent index. In this way, it is possible to calculate the ink amount sets φ capable of reproduction of the same color of that of the target TG for all the indexes. That is, the ink amount sets φ capable of reproduction of the spectral reflectivity R (λ), as in all targets TG1 to TG12, can be calculated for all targets TG1 to TG12 subjected to color measurement in Step S140 of the print data generating process (see FIG. 2). In Step S240, when it is determined that optimum ink amount sets φ of all the indexes are calculated, the LOM P3a4 generate a 1D-LUT and outputs the 1D-LUT to the PDV P3b in Step S250.

FIG. 12 is a diagram illustrating an example of the 1D-LUT. In the drawing, the optimum ink amount sets φ individually corresponding to the indexes are stored. That is, in each of the targets TG1 to TG12, the 1D-LUT describing the ink amount set φ capable of reproduction of the appearance similar to that of each of the targets TG1 to TG12 in the printer 20 can be prepared. When the 1D-LUT is output to the PDV P3b, the 1D-LUT generating process is completed and then the printing control data generating process (Step S300) as a subsequent process is performed.

3-2. Printing Control Data Generating Process

Figure 13:
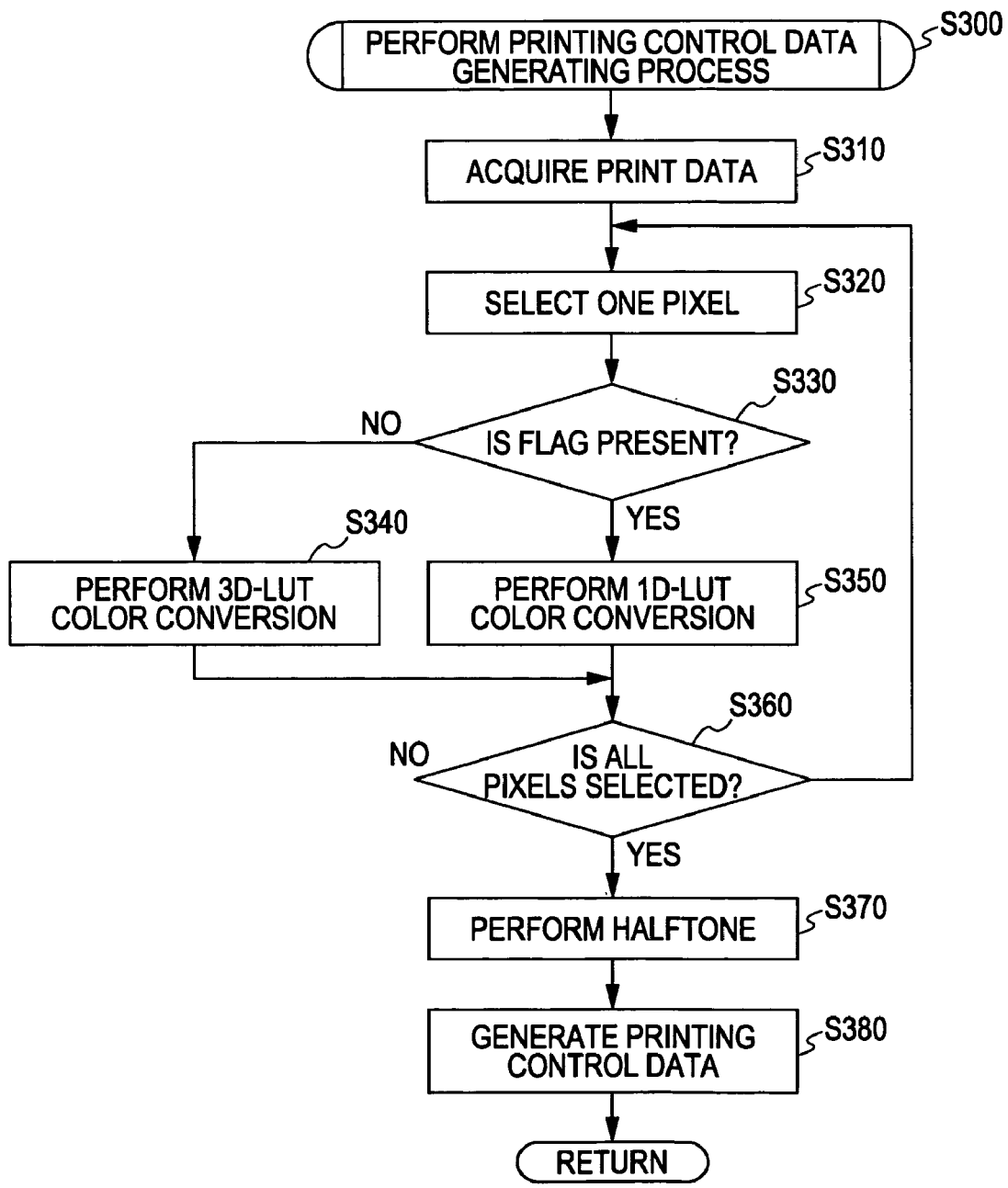
FIG. 13 is a flowchart illustrating a flow of a printing control data generating process.

FIG. 13 is a flowchart illustrating a flow of the printing control data generating process. The PDV P3b shown in FIG. 2 includes a mode determining module (MIM) P3b1, an index converting module (ISM) P3b2, an RGB converting module (CSM) P3b3, a halftone module (HTM) P3b4, and a rasterization module (RTM) P3b5. In Step S310, the MIM P3b1 acquires the print data PD. In Step S320, the MIM P3b1 selects one pixel from the print data PD. In Step S330, the MIM P3b1 determines whether the flag indicating that the index is stored in the selected pixel is set. When it is determined that the flag is not set, the CSM P3b3 performs color conversion (plate division) on the selected pixel with reference to the 3D-LUT in Step S340.

Figure 14:
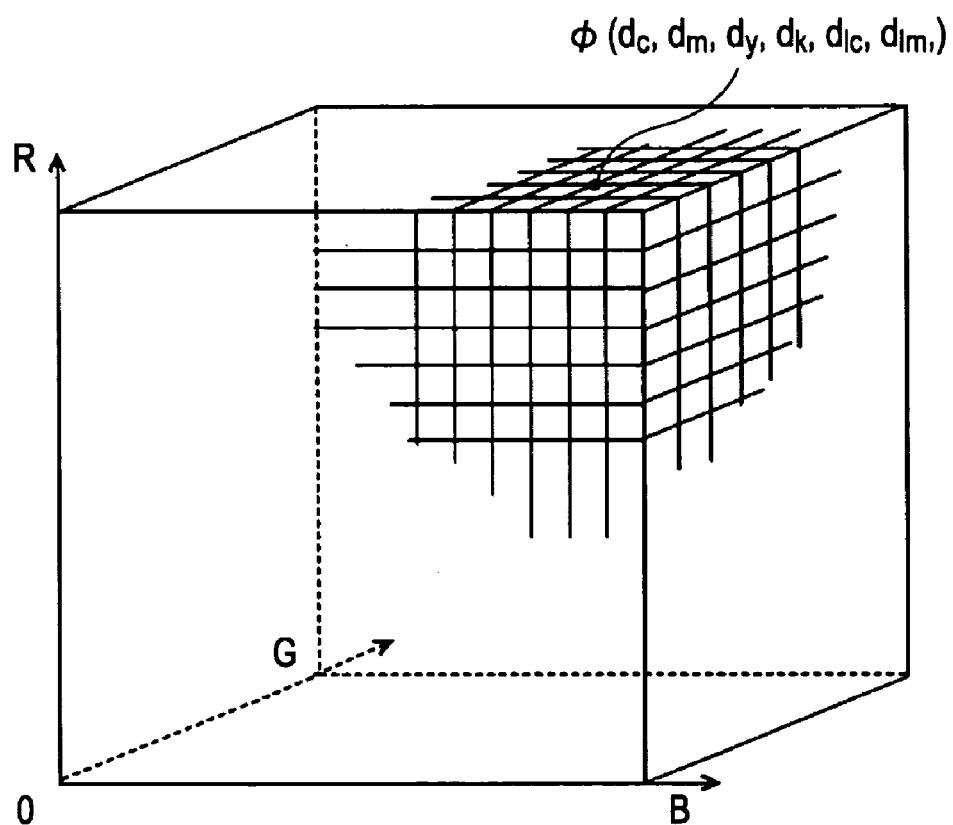
FIG. 14 is a diagram illustrating a 3D-LUT.

FIG. 14 is a diagram illustrating the 3D-LUT. In the drawing, the 3D-LUT is a table which describes a correspondence relation between the RGB values and the ink amount sets φ ($d_C$, $d_M$, $d_Y$, $d_K$, $d_{1c}$, $d_{1m}$) for plural representative coordinates in a color space. The CSM P3b3 acquires the ink amount set φ corresponding to the RGB value of the corresponding pixel with reference to the 3D-LUT. At this time, the CSM P3b3 acquires the ink amount set φ corresponding to the RGB value which is not directly described in the 3D-LUT, by performing interpolation calculation. As a method of creating the 3D-LUT, a method disclosed in JP-A-2006-82460 may be used. In this document, there is created the 3D-LUT which is overall good in a reproducibility of a color under a specific light source, a gray scale property of the reproduced color, a granularity, a light source independent property of the reproduced color, a gamut, or an ink duty.

Alternatively, when it is determined that the flag indicating that the index is stored in the selected pixel is set in Step S330, the ISM P3b2 performs the color conversion (plate division) on the selected pixel with reference to the 1D-LUT in Step S350. That is, the index is acquired from the pixel in which the flag indicating the index is stored, and the ink amount set φ corresponding to the index is acquired from the 1D-LUT. When it is possible to acquire the ink amount set φ for the selected pixel in one of Step S340 and Step S350, it is determined whether the ink amount sets φ for all the pixels can be acquired in Step S360. Here, when the pixel in which the ink amount set φ is not acquired remains, the process returns to Step S320 to select a subsequent pixel.

By repeatedly performing the above processes, it is possible to acquire the ink amount sets φ for all the pixels. When it is possible to acquire the ink amount sets φ for all the pixels, the converted print data PD in which the all the pixels are expressed by the ink amount sets φ are obtained. By determining whether to use one of the 1D-LUT and the 3D-LUT for each of the pixels, as for the pixel corresponding to each of the frames F1 to F12 in which the index is stored, it is possible to acquire the ink amount set φ capable of reproduction of a color close to that of each of the targets TG1 to TG12 under each light source. Moreover, as for the pixel in which the RGB value is stored, it is possible to the ink amount set φ capable of color reproduction which is based on a guide (for example, placing emphasis on the granularity) of creating the 3D-LUT.

In Step S370, the HTM P3b4 acquires the print data PD in which each of the pixels is expressed with the ink amount set φ to perform a halftone process. The HTM P3b4 can use a known dither method or a known error diffusion method, when performing the halftone process. The print data PD subjected to the halftone process has an ejection signal indicating whether to eject each ink for each pixel. In Step S380, the RTM P3b5 acquires the print data PD subjected to the halftone process and perform a process of allocating the ejection signal of the print data PD to each scanning pass and each nozzle of a print head of the printer 20. In this way, the printing control data CD which can be output to the printer 20 is generated. In addition, the printing control data CD attached to a signal necessary to control the printer 20 is output to the spooler P1b and the printer 20. Then, the printer 20 ejects the ink onto a print sheet to form the sample chart SC.

In this way, it is possible to reproduce the target spectral reflectivity $R_t (\lambda)$ of each of the targets TG1 to TG12 in the areas corresponding to the frames FL1 to FL12 of the sample chart SC formed on the print sheet. That is, since the area corresponding to the frames FL1 to FL12 is printed with the ink amount sets φ suitable for the colors of the targets TG1 to TG12 under the plural light sources, it is possible to reproduce colors similar to those of the targets TG1 to TG12 under each of the light sources. For example, the colors of the areas corresponding to the frames FL1 to FL12 when the sample chart SC is viewed indoors are reproduced into the colors when the targets TG1 to TG12 are viewed indoors. In addition, the colors of the areas corresponding to the frames FL1 to FL12 when the sample chart SC is viewed outdoors are also reproduced into the colors when the targets TG1 to TG12 are viewed outdoors.

Ultimately, when the sample chart SC having the completely same spectral reflectivity $R (\lambda)$ as that of the targets TG1 to TG12 is reproduced, it is possible to reproduce the same colors as those of the targets TG1 to TG12 under any light source. However, since the ink (kinds of a color material) usable for the printer 20 is restricted to CMYKlclm, it is impossible to actually obtain the ink amount sets φ capable of reproduction of the completely same spectral reflectivity $R (\lambda)$ as that of the targets TG1 to TG12. In addition, even when the ink amount sets φ capable of reproduction of the same spectral reflectivity $R (\lambda)$ as that of the targets TG1 to TG12 are obtained in a wavelength region which does not affect a perceived color, it is not useless in realization of a visual reproduction degree. In contrast, since an approximation to the target spectral reflectivity $R_t (\lambda)$ is evaluated using the evaluation value $E (\phi)$ to which a weight based on the basis of the color-matching functions $x (\lambda)$, $y (\lambda)$, and $z (\lambda)$ is added, it is possible to obtain the ink amount set φ realized sufficiently in terms of visibility.

On the other hand, in the areas corresponding to the frames FL1 to FL12 of the sample chart SC formed on the print sheet, printing is performed with the ink amount sets φ which are based on the 3D-LUT described above. Therefore, a printing performance in the areas is based on the 3D-LUT. As described above, the area other than the areas corresponding to the frames FL1 to FL12 in this embodiment is indicated by the image of the intermediate gray, but satisfies the printing performance which is a goal of the 3D-LUT in the areas. That is, it is possible to perform printing so as overall satisfy a gray scale property of the reproduced color, a granularity, a light source independent property of the reproduced color, a gamut, and an ink duty.

4. Spectral Printing Model

Figure 15:
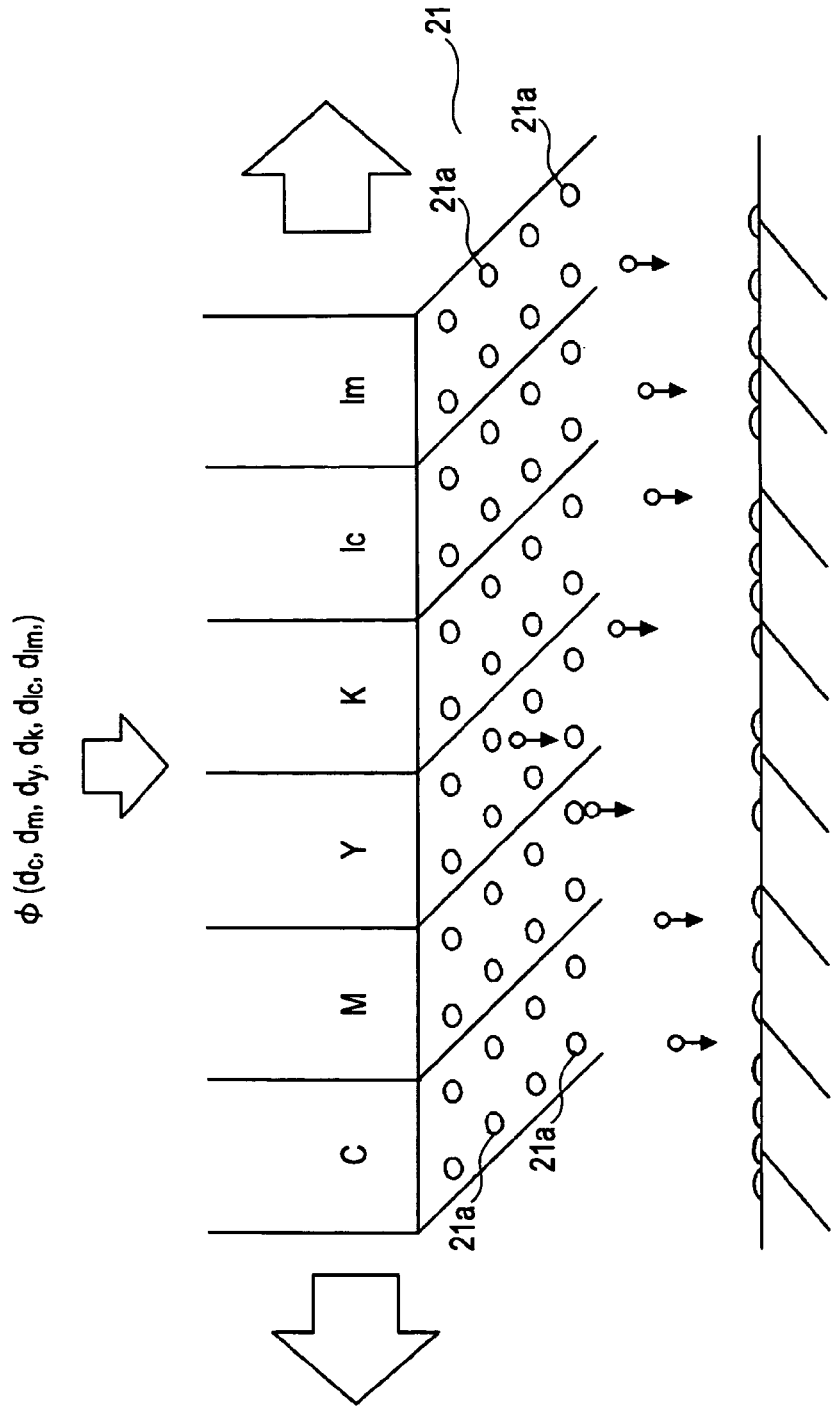
FIG. 15 is a schematic diagram illustrating a printing method of a printer.

FIG. 15 is a schematic process illustrating a printing method of the printer 20 according to this embodiment. In the drawing, the printer 20 includes a print head 21 having plural nozzles 21a for each of CMYKlclm ink and an amount of each of CMYKlclm ink ejected from the nozzles 21a is controlled to become an amount of ink designated in the ink amount set φ ($d_c$, $d_m$, $d_y$, $d_k$, $d_{1c}$, $d_{1m}$) on the basis of the printing control data CD. Ink droplets ejected from the nozzles 21a turn to minute dots on the print sheet and a print image of ink coverage conforming to the ink amount set φ ($d_c$, $d_m$, $d_y$, $d_k$, $d_{1c}$, $d_{1m}$) is formed on the print sheet by collection of the numerous dots.

The estimation model (spectral printing model) used by the RPM P3a2 is an estimation model used to estimate the spectral reflectivity $R (\lambda)$ obtained upon performing printing with an arbitrary ink amount set φ ($d_c$, $d_m$, $d_y$, $d_k$, $d_{1c}$, $d_{1m}$) used in the printer 20 according to this embodiment as the estimation spectral reflectivity $R_s (\lambda)$. In the spectral printing model, a color patch is actually printed for plural representative points in an ink amount space, and the spectral reflectivity database RDB obtained by measuring the spectral reflectivity $R (\lambda)$ by use of the spectral reflectometer is created. The spectral reflectivity $R (\lambda)$ obtained upon precisely performing printing with the arbitrary ink amount set φ ($d_c$, $d_m$, $d_y$, $d_k$, $d_{1c}$, $d_{1m}$) is estimated by the Cellular Yule-Nielsen Spectral Neugebauer Model using the spectral reflectivity database RDB.

Figure 16:
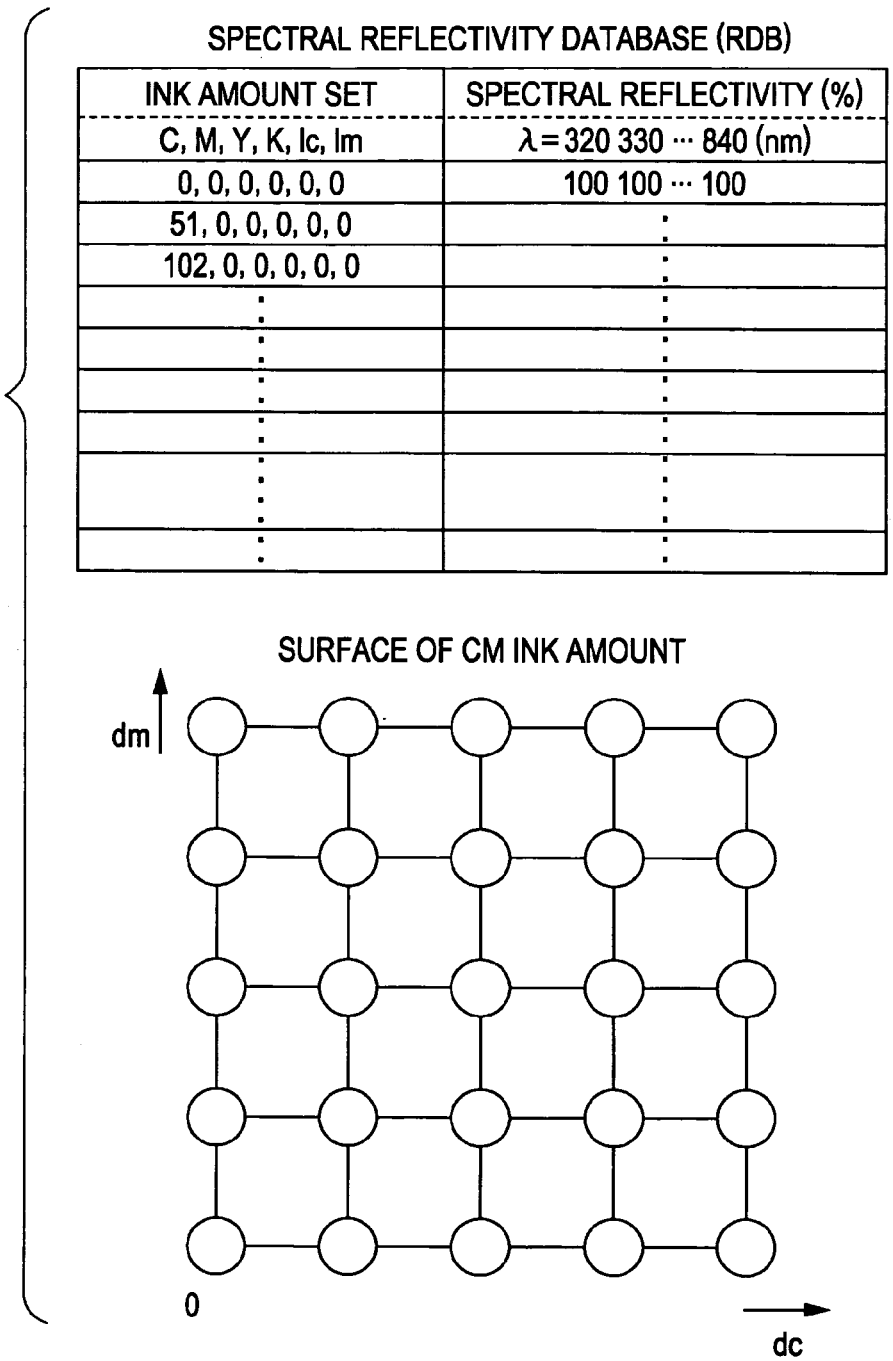
FIG. 16 is a diagram illustrating a spectral reflectivity database.

FIG. 16 is a diagram illustrating the spectral reflectivity database RDB. As shown in the drawing, the spectral reflectivity database RDB is configured as a lookup table which describes the spectral reflectivity $R (\lambda)$ obtained by actually printing/measuring each of the ink amount sets φ ($d_c$, $d_m$, $d_y$, $d_k$, $d_{1c}$, $d_{1m}$) of plural lattice points in the ink amount space (which is a six-dimensional space, but in this embodiment, only a CM surface is illustrated for easy illustration of the drawing). For example, lattice points of five grids dividing ink amount axes are generated. Here, $5^{13}$ lattice points are generated and it is necessary to print/measure an enormous amount of color patches. However, actually, since the number of ink simultaneously mounted on the printer 20 or ink duty capable of simultaneous ejection is restrictive, the number of lattice points to be printed/measured is limited.

Only some lattice points may be actually printed/measured. In addition, as for the other lattice points, the number of color patches to be actually printed/measured may be decreased by estimating the spectral reflectivity $R (\lambda)$ on the basis of the spectral reflectivity $R (\lambda)$ of the lattice points actually subjected to printing/measuring. The spectral reflectivity database RDB needs to be created for every print sheet to be printed by the printer 20. Precisely, the reason for creating the spectral reflectivity $R (\lambda)$ for every print sheet is because the spectral reflectivity $R (\lambda)$ is determined depending on the spectral reflectivity made by an ink film (dot) formed on a print sheet and reflectivity of the print sheet and receives an influence of a surface property (on which a dot formation is dependent) or the reflectivity of the print sheet.

Next, estimation obtained by the Cellular Yule-Nielsen Spectral Neugebauer Model using the spectral reflectivity database RDB will be described.

The RPM P3a2 performs the estimation by use of the Cellular Yule-Nielsen Spectral Neugebauer Model using the spectral reflectivity database RDB by request of the ICM P3a1. In the estimation, an estimation condition is acquired from the ICM P3a1 and the estimation condition is set. Specifically, the print sheet or the ink amount set φ is set as a print condition. For example, when a glossy sheet is set as the print sheet for performing the estimation, the spectral reflectivity database RDB created by printing the color patch on the glossy sheet is set.

When the spectral reflectivity database RDB can be set, the ink amount sets φ ($d_c$, $d_m$, $d_y$, $d_k$, $d_{1c}$, $d_{1m}$) input from the ICM P3a1 is applied to the spectral printing model. The Cellular Yule-Nielsen Spectral Neugebauer Model is based on well-known Spectral Neugebauer Model and Yule-Nielsen Model. In the following description, a model in which three kinds of CMY ink are used for easy description will be described, but it is easy to expand the same model to a model using an arbitrary ink set including the CMYKlclm ink according to this embodiment. The Cellular Yule-Nielsen Spectral Neugebauer Model is referred to Color Res Appl 25, 4-19, 2000 and R Balasubramanian, Optimization of the spectral Neugebauer model for printer characterization, J. Electronic Imaging 8 (2), 156-166 (1999).

FIG. 17 is a diagram illustrating the Spectral Neugebauer Model. In the Spectral Neugebauer Model, the estimation spectral reflectivity $R_s(\lambda)$ of a sheet printed with an arbitrary ink amount set φ ($d_c$, $d_m$, $d_y$) is given by Expression (4) as follows:

[Expression 4].

$$R_s(\lambda) = a_w R_w(\lambda) + a_c R_c(\lambda) + a_m R_m(\lambda) + a_y R_y(\lambda) + a_r R_r(\lambda) + a_g R_g(\lambda) + a_b R_b(\lambda) + a_k R_k(\lambda)$$

$$a_w = (1-f_c)(1-f_m)(1-f_y)$$

$$a_c = f_c(1-f_m)(1-f_y)$$

$$a_m = (1-f_c)f_m(1-f_y)$$

$$a_y = (1-f_c)(1-f_m)f_y$$

$$a_r = (1-f_c)f_m f_y$$

$$a_g = f_c(1-f_m)f_y$$

$$a_b = f_c f_m(1-f_y)$$

$$a_k = f_c f_m f_y \quad (4)$$

In this expression, $a_i$ is an i-th area ratio and $R_i(\lambda)$ is an i-th spectral reflectivity. The subscript i each indicates an area (w) in which ink is not present, an area (c) in which only cyan ink is ejected, an area (m) in which only magenta ink is ejected, an area (y) in which only yellow ink is ejected, an area (r) in which magenta ink and yellow ink are ejected, an area (g) in which yellow ink and cyan ink are ejected, an area (b) in which cyan ink and magenta ink are ejected, and an area (k) in which three CMY kinds of ink are ejected. In addition, each of $f_c$, $f_m$, and $f_y$ indicates a ratio (which is referred to as "an ink area coverage") of an area covered with only one kind of ink among CMY ink.

The ink area coverages $f_c$, $f_m$, and $f_y$ are given by the Murray Davis Model shown in (B) of FIG. 17. In the Murray Davis Model, the ink area coverage $f_c$ of cyan ink is a non-linear function of an ink amount $d_c$ of cyan, for example. The ink amount $d_c$ can be converted into the ink area coverage $f_c$ with reference to a one-dimensional lookup table, for example. The reason that the ink area coverages $f_c$, $f_m$, and $f_y$ are non-linear functions of the $d_c$, $d_m$, and $d_y$ is that since ink sufficiently spreads upon ejecting a small amount of ink onto a unit area but ink overlaps with each other upon ejecting a large amount of ink onto the unit area, an area covered with the ink does not increase sufficiently. The same is applied to the other kinds of MY ink.

When the Yule-Nielsen Model for the spectral reflectivity is applied, Expression (4) described above can be changed into Expression (5a) or Expression (5b) as follows:

[Expression 5], $$R_s(\lambda)^{1/n} = a_w R_w(\lambda)^{1/n} + a_c R_c(\lambda)^{1/n} + a_m R_m(\lambda)^{1/n} + a_y R_y(\lambda)^{1/n} + a_r R_r(\lambda)^{1/n} + a_g R_g(\lambda)^{1/n} + a_b R_b(\lambda)^{1/n} + a_k R_k(\lambda)^{1/n} \quad (5a)$$

$$R_s(\lambda) = \{a_w R_w(\lambda)^{1/n} + a_c R_c(\lambda)^{1/n} + a_m R_m(\lambda)^{1/n} + a_y R_y(\lambda)^{1/n} + a_r R_r(\lambda)^{1/n} + a_g R_g(\lambda)^{1/n} + a_b R_b(\lambda)^{1/n} + a_k R_k(\lambda)^{1/n}\}^n \quad (5b)$$

where n is a predetermined coefficient of 1 or more and n=10 may be set, for example. Expression (5a) or Expression (5b) is an expression expressing the Yule-Nielsen Spectral Neugebauer Model.

The Cellular Yule-Nielsen Spectral Neugebauer Model is a model in which the ink amount space of the Yule-Nielsen Spectral Neugebauer Model described above is divided into plural cells.

Figure 18:
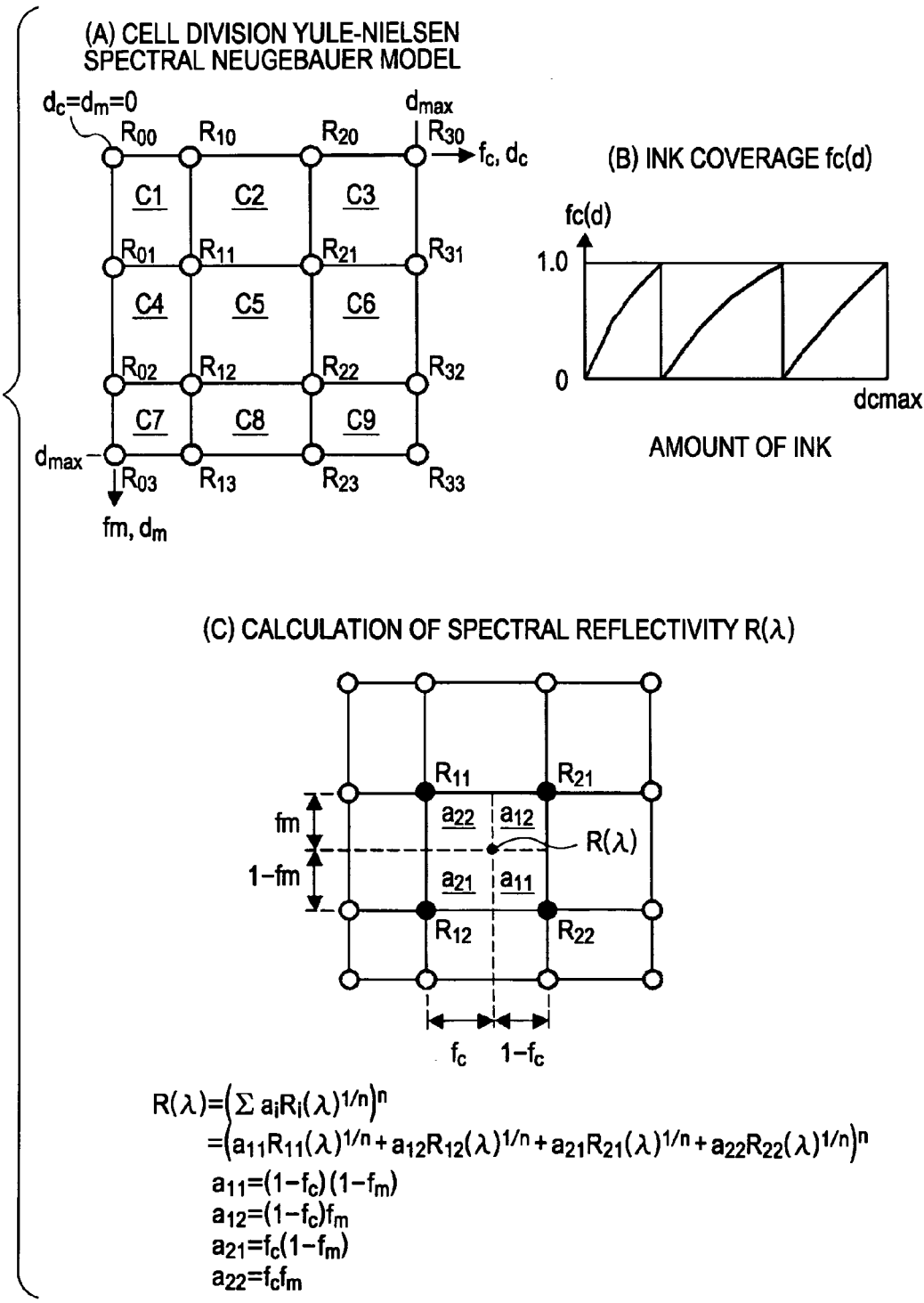
FIG. 18 is a diagram illustrating a cell division Yule-Nielsen spectral neugebauer model.

(A) of FIG. 18 is a diagram illustrating an example of a cell division in the Cellular Yule-Nielsen Spectral Neugebauer Model. Here, for easy description, the cell division is drawn in a two-dimensional ink amount space containing two axes of the ink amounts $d_c$ and $d_m$ of CM ink. Since the ink area coverages $f_c$ and $f_m$ have a unique relation with the ink amounts $d_c$ and $d_m$, respectively, in the Murray Davis Model described above, the axes can be considered to be axes indicating the ink area coverages $f_c$ and $f_m$. White circles indicate grid points of the cell division and the two-dimensional ink amount (area coverage) space is divided into nine cells C1 to C9. Ink amount sets ($d_c$, $d_m$) individually corresponding to the lattice points are configured as ink amount sets corresponding to the lattice points defined in the spectral reflectivity database RDB. That is, with reference to the spectral reflectivity database RDB described above, the spectral reflectivity $R(\lambda)$ of each of the lattice points can be obtained. Accordingly, the spectral reflectivities $R(\lambda)_{00}$, $R(\lambda)_{10}$, $R(\lambda)_{20}$ ... $R(\lambda)_{33}$ of the lattice points can be obtained from the spectral reflectivity database RDB.

Actually, in this embodiment, the cell division is also performed in the six-dimensional ink amount space of the CMYKlclm ink and coordinates of the lattice points are represented by the six-dimensional ink amount sets φ ($d_c$, $d_m$, $d_y$, $d_k$, $d_{1c}$, $d_{1m}$). In addition, the spectral reflectivity $R(\lambda)$ of each of the lattice points corresponding to the ink amount set φ ($d_c$, $d_m$, $d_y$, $d_k$, $d_{1c}$, $d_{1m}$) of each of the lattice points is obtained from the spectral reflectivity database RDB (which is a database of a glossy sheet, for example).

(B) of FIG. 18 is a diagram illustrating a relation between the ink area coverage $f_c$ and the ink amount $d_c$ used in a cell division model. Here, a range from 0 to $d_{cmax}$ in an amount of one kind of ink is divided into three sections. In addition, an imaginary ink area coverage $f_c$ used in the cell division model is obtained by a non-linear curve which shows a monotonous increase from 0 to 1 in every section. The ink area coverages $f_m$ and $f_y$ of the other ink are obtained in the same manner.

(C) of FIG. 18 is a diagram illustrating a method of calculating the estimation spectral reflectivity $R_s(\lambda)$ obtained when printing is performed with an arbitrary ink amount set $(d_c, d_m)$ within a cell C5 located at the center of (A) of FIG. 18. The spectral reflectivity R (λ) obtained when printing is performed with an arbitrary ink amount set $(d_c, d_m)$ is given by Expression (6) as follows:

[Expression 6]

$$R_s(\lambda) = \left(\sum a_i R_i(\lambda)^{1/n}\right)^n \quad (6)$$
$$= (a_{11}R_{11}(\lambda)^{1/n} + a_{12}R_{12}(\lambda)^{1/n} +$$
$$a_{21}R_{21}(\lambda)^{1/n} + a_{22}R_{22}(\lambda)^{1/n})^n$$
$$a_{11} = (1-f_c)(1-f_m)$$
$$a_{12} = (1-f_c)f_m$$
$$a_{21} = f_c(1-f_m)$$
$$a_{22} = f_c f_m,$$

where the ink area coverages $f_c$ and $f_m$ in Expression (6) are values given in the graph of (B) of FIG. 18. Spectral reflectivities R $(\lambda)_{11}$, $(\lambda)_{12}$, $(\lambda)_{21}$, and $(\lambda)_{22}$ corresponding to four lattice points surrounding the cell C5 can be obtained with reference to the spectral reflectivity database RDB. In this way, all values of a right side of Expression (6) can be decided. In addition, as a calculation result, the estimation spectral reflectivity $R_s$ (λ) obtained when printing is performed with the arbitrary ink amount set φ $(d_c, d_m)$ can be calculated. By shifting a wavelength λ in sequence in the visible wavelength region, it is possible to the estimation spectral reflectivity $R_s$ (λ) in the visible wavelength region. When the ink amount space is divided into the plural cells, the estimation spectral reflectivity $R_s$ (λ) can be calculated more precisely, compared to a case where the ink amount space is not divided. In this way, the RPM P3a2 is capable of estimating the estimation spectral reflectivity $R_s$ (λ) by request of the ICM P3a1.

5. Modified Examples

5-1. Modified Example 1

FIG. 19 is a schematic diagram illustrating a weight function w (λ) set by the ECM P3a3 according to a modified example. In the drawing, a target spectral reflectivity $R_t$ (λ) obtained form a target TG is shown. In addition, the ECM P3a3 calculates each of correlation coefficients $c_x$, $c_y$, and $c_z$ between each of color-matching functions x (λ), y (λ), and z (λ) and the target spectral reflectivity $R_t$ (λ). In addition, the weight function w (λ) is calculated by Expression (7) according to this modified example:

[Expression 7].

$$w(\lambda) = c_x x(\lambda) + c_y y(\lambda) + c_z z(\lambda) \quad (7)$$

In Expression (7), a weight at the time of linear combination is configured to increase by the color-matching functions x (λ), y (λ), and z (λ) having high correlation with the target spectral reflectivity $R_t$ (λ) obtained from the target TG. In the weight function w (λ) obtained in this manner, a weight for a wavelength region having the large target spectral reflectivity $R_t$ (λ) of the target TG can be emphasized. Accordingly, it is possible to obtain the evaluation value E (φ) placing emphasis on a wavelength in which a spectrum of a spectral energy of reflected light under each light source becomes easily strong. That is, particularly, in the wavelength region having the large target spectral reflectivity $R_t$ (λ) of the target TG, it is possible to obtain an optimum solution of the ink amount set 4 in which a difference between the target spectral reflectivity $R_t$ (λ) and the estimation spectral reflectivity $R_s$ (λ) of the target TG is not permitted. Of course, since the weight function w (λ) is obtained from each of the color-matching functions x (λ), y (λ), and z (λ), the evaluation value E (φ) suitable for human perception can be obtained.

5-2. Modified Example 2

FIG. 20 is a schematic diagram illustrating a weight function w (λ) set by the ECM P3a3 according to another modified example. In the drawing, the target spectral reflectivity $R_t$ (λ) obtained from the target TG is applied to the weight function w (λ) without any change. In this way, particularly, in the wavelength region having the large target spectral reflectivity $R_t$ (λ) of the target TG, it is possible to also obtain an optimum solution of the ink amount set φ in which a difference between the target spectral reflectivity $R_t$ (λ) and the spectral reflectivity R (λ) of the target TG is not permitted.

5-3. Modified Example 3

Figure 21:
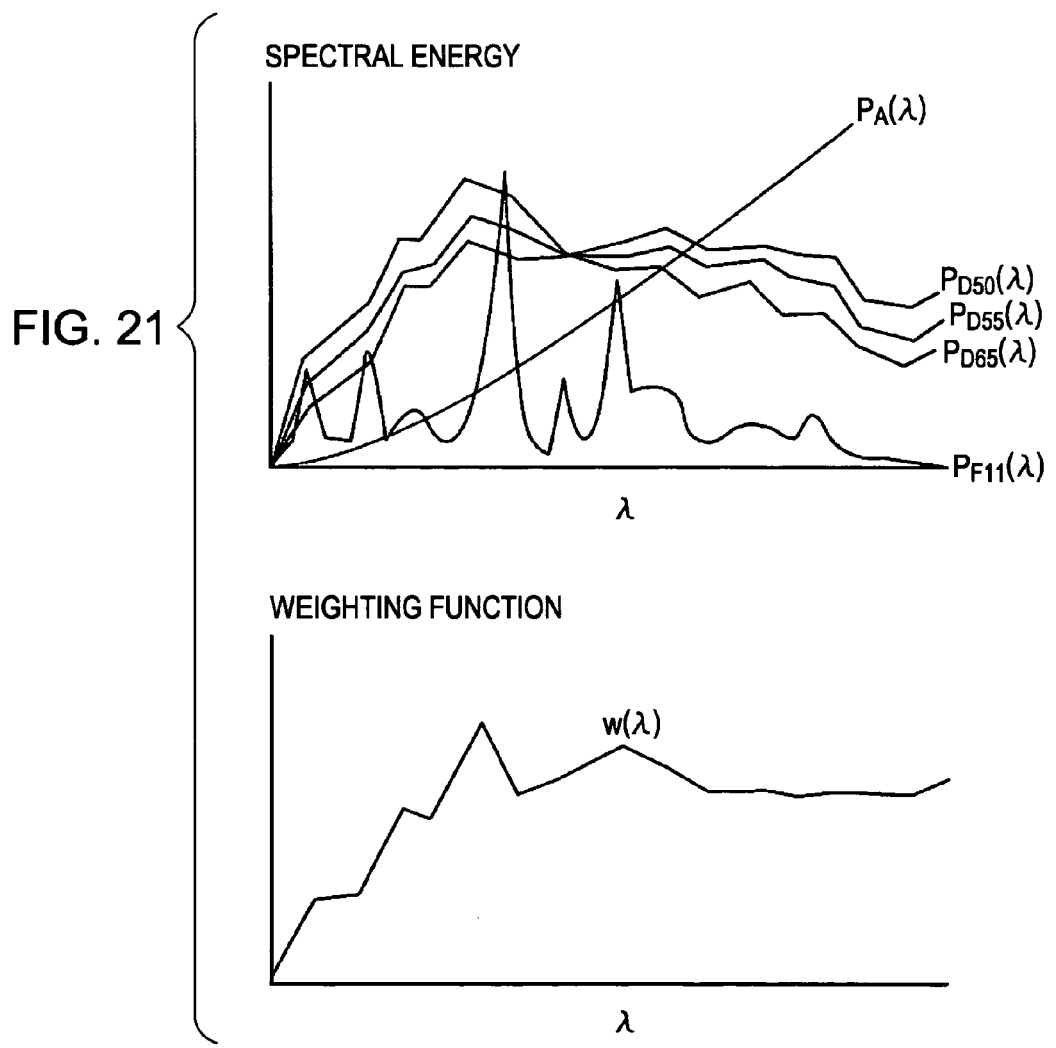
FIG. 21 is a schematic diagram illustrating a weight function according to a modified example.

FIG. 21 is a schematic diagram illustrating a weight function w (λ) set by the ECM P3a3 according to another modified example. The drawing shows spectral energies $P_{D50}$ (λ), $P_{D55}$ (P), $P_{D65}$ (λ), $P_A$ (λ), and $P_{F11}$ (λ) of five kinds of light sources (a D50 light source, a D55 light source, and a D65 light sources of a standard daylight system, an A light source of an incandescent lamp system, and an F11 light source of a fluorescent lamp system). In this modified example, a weight function w (λ) is calculated by linear combination of the spectral energies $P_{D50}$ (λ), $P_{D55}$ (λ), $P_{D65}$ (λ), $P_A$ (λ), and $P_{F11}$ (λ) by Expression (8) as follows:

[Expression 8].

$$w(\lambda) = w_1 P_{D50}(\lambda) + w_2 P_{D60}(\lambda) + w_3 P_{D65}(\lambda) + w_4 P_A(\lambda) + w_5 P_{F11}(\lambda) \quad (8)$$

In Expression (8), $w_1$ to $w_5$ are weight coefficients used to set a weight for each of the light sources. In this way, by setting the weight function w (λ) obtained from the spectral energy distributions $P_{D50}$ (λ), $P_{D55}$ (λ), $P_{D65}$ (λ), $P_A$ (λ), and $P_{F11}$ (λ) of the light sources, it is possible to obtain the evaluation value E (φ) placing emphasis on the wavelength region in which a spectrum of a spectral energy of reflected light under each light source becomes easily strong. Moreover, it is possible to also adjust weight coefficients $w_1$ to $w_5$. For example, when it is desired to ensure color reproduction in all the light sources in balance, a relation of $w_1 = w_2 = w_3 = w_4 = w_5$ is satisfied. When it is desired to place emphasis on the color reproduction under an artificial light source, a relation of $w_1$, $w_2$, $w_3 < w_4$, $w_5$ is satisfied.

5-4. Modified Example 4

Figure 22:
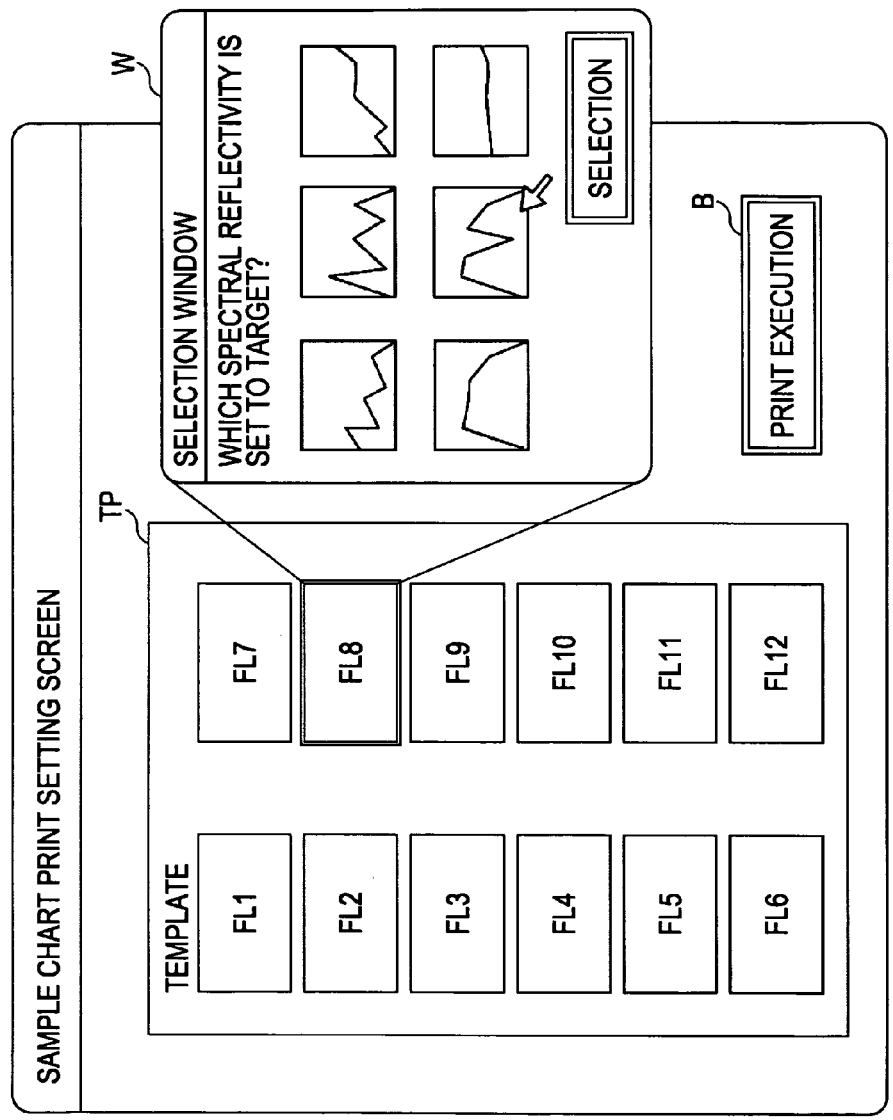
FIG. 22 is a diagram illustrating a UI screen according to a modified example.

FIG. 22 is a diagram illustrating a UI screen displayed on the display 40 according to a modified example. In the drawing, graphs of plural target spectral reflectivities $R_t$ (λ) are displayed on the UI screen. By displaying this UI screen, a user can selects a graph having a desired waveform as the target spectral reflectivity $R_t$ (λ) of the target TG, instead of measuring the target spectral reflectivity $R_t$ (λ) of the target TG in Step S140. In this way, it is possible to set the target spectral reflectivity $R_t$ (λ) without actual measurement of the spectral reflectivity. Of course, the user may directly edit the waveform of the graph. For example, once the target spectral reflectivity $R_t$ (λ) which is a target upon developing a new object surface is edited, it is possible to allow the printer 20 to print the sample chart SC having the target spectral reflectivity $R_t(\lambda)$ which is a target without actually experimental manufacture of the object surface.

5-5. Modified Example 5

Figure 23:
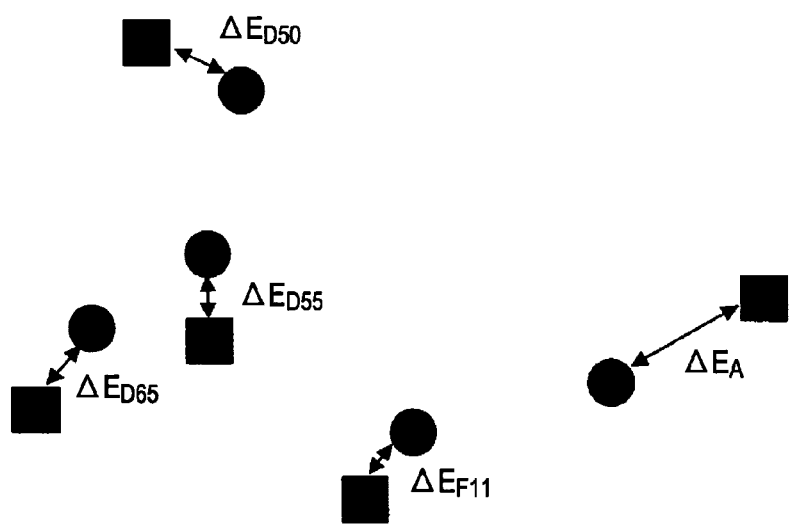
FIG. 23 is a schematic diagram illustrating an evaluation value according to a modified example.

FIG. 23 is a diagram schematically illustrating an evaluation value ($\phi$) according to a modified example. In the drawing, a color value (target color value) obtained upon radiating the above-described five kinds of light sources in the target spectral reflectivity $R_t(\lambda)$ of the target TG is calculated by use of Expression (1) described above in FIG. 5. On the other hand, a color value (estimation color value) obtained upon radiating the five kinds of light sources in the estimation spectral reflectivity $R_s(\lambda)$ estimated by the RPM P3a2 is also calculated by Expression (1) (which is used by replacement of $R_t(\lambda)$ by $R_s(\lambda)$) described above in FIG. 5. In addition, a color difference $\Delta E$ ($\Delta E_{2000}$) of the target color value and the estimation color value under each of the light sources is calculated on the basis of a color difference expression of a CIE DE 2000. When it is assumed that color differences $\Delta E$ for the light sources are $\Delta E_{D50}$, $\Delta E_{D55}$, $\Delta E_{D65}$, $\Delta E_A$, and $\Delta E_{F11}$, respectively, the evaluation value E ($\phi$) is calculated by Expression (9):

[Expression 9].

$$E(\phi) = w_1 \Delta E_{D50} + w_2 \Delta E_{D55} + w_3 \Delta E_{D65} + w_4 \Delta E_A + w_{F11} \quad (9)$$

In Expression (2), $w_1$ to $w_5$ are weight coefficients used to set a weight for each of the light sources and has the substantially same property as that of the weight coefficients $w_1$ to $w_5$ described in Modified Example 3. Here, when it is desired to ensure color reproduction in all the light sources in balance, a relation of $w_1 = w_2 = w_3 = w_4 = w_5$ is satisfied. When it is desired to place emphasis on the color reproduction under an artificial light source, a relation of $w_1$, $w_2$, $w_3 < w_4$, $w_5$ is satisfied.

5-6. Modified Example 6

In the area corresponding to the frame F which is not selected in the embodiment described above, printing may be performed with the same color of that of the area other than the frame F. Of course, since it is not necessary to request spectral reproduction in the area corresponding to the frame F which is not selected, the color conversion may be performed using the 3D-LUT similarly to the area other than the frame F. In addition, in the area other than the area corresponding to the frame F in which the target TG is designated, a shape, a character, a mark, or the like may be printed. For example, a character representing which the target TG is may be recorded in the vicinity of the frame F in which the target TG is designated.

5-7. Modified Example 7

Figure 24:
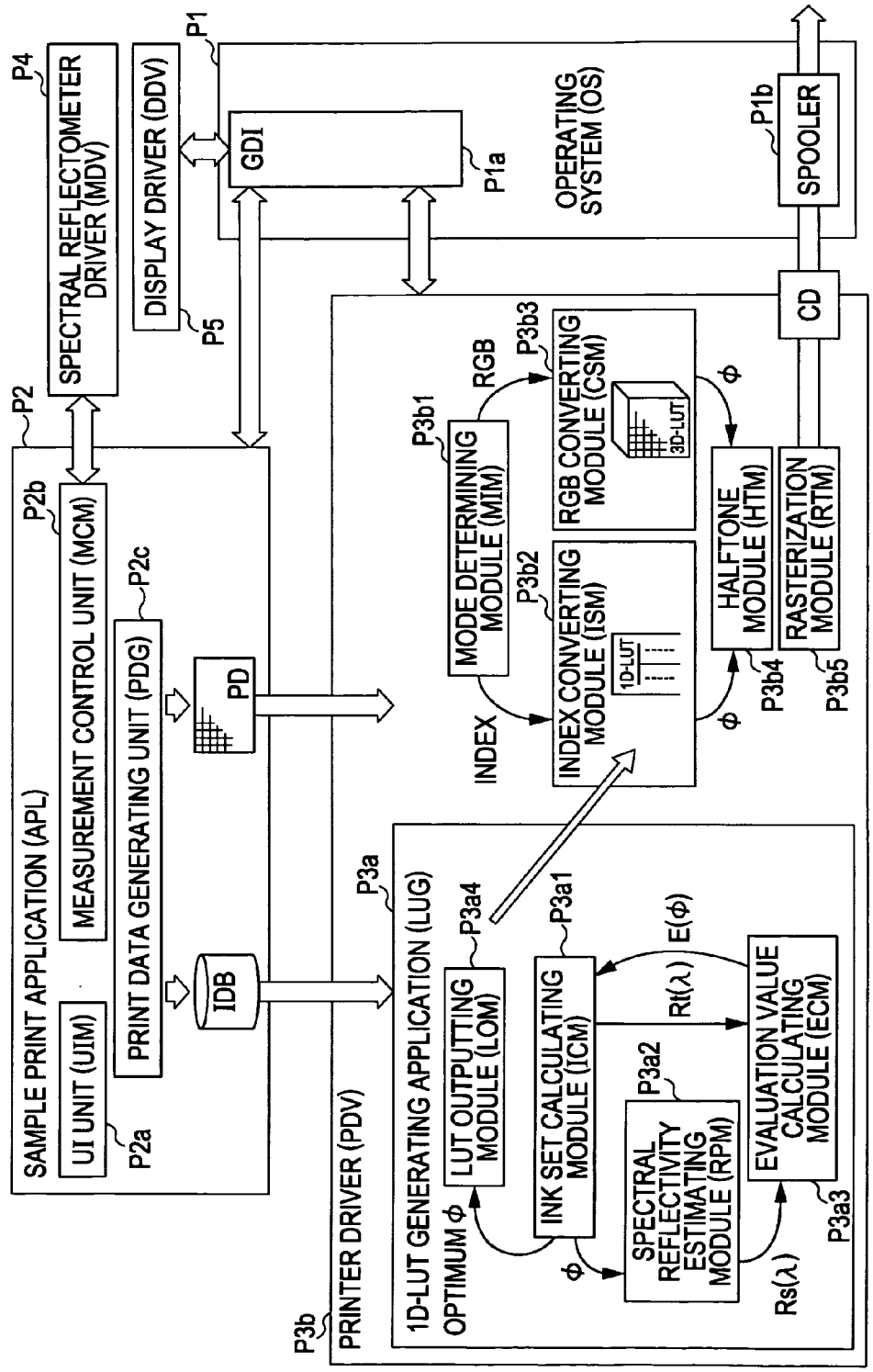
FIG. 24 is a diagram illustrating the software configuration of a printing system according to a modified example.
Figure 25:
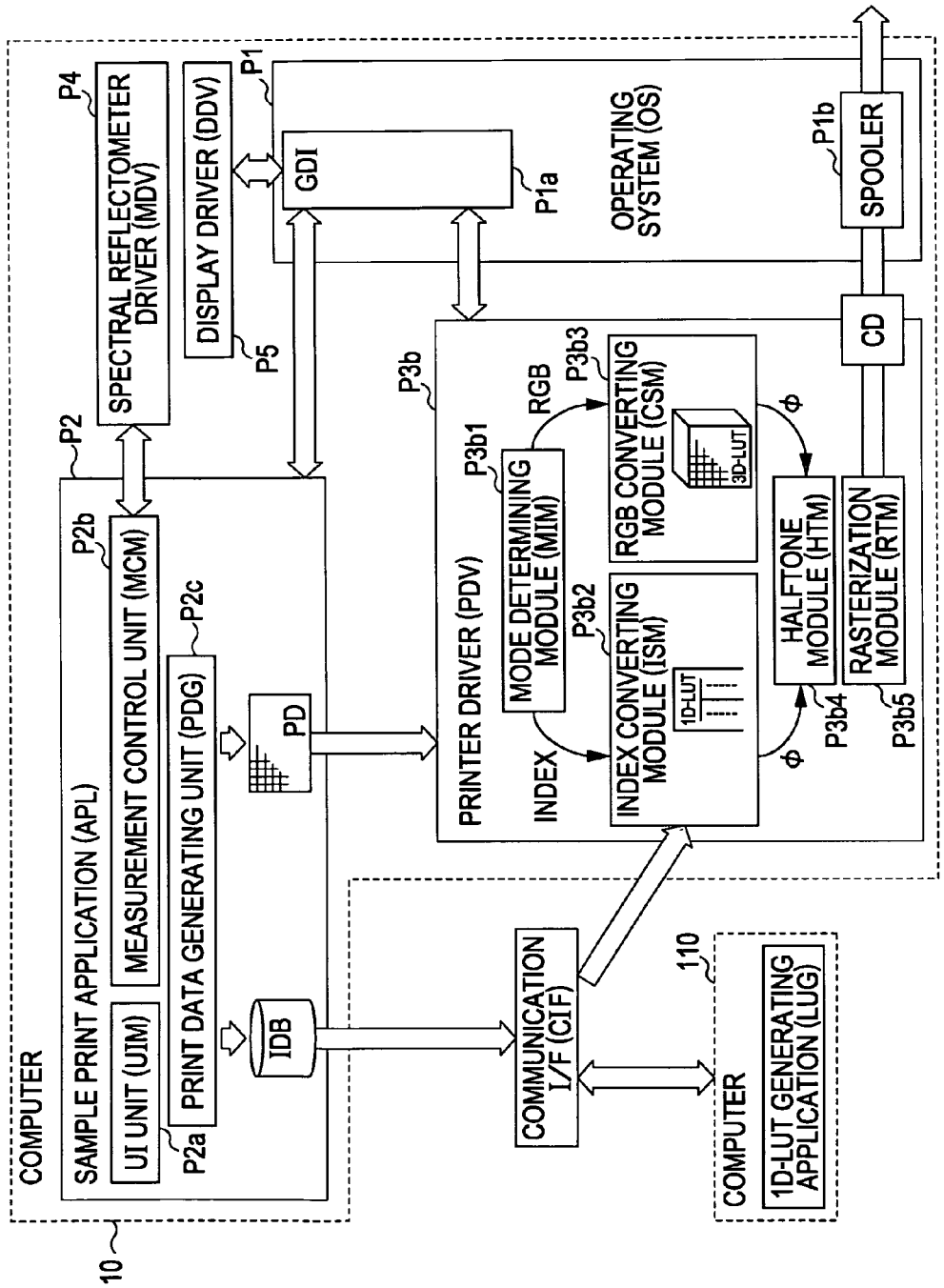
FIG. 25 is a diagram illustrating the software configuration of a printing system according to a modified example.

FIGS. 24 and 25 are diagrams illustrating the software configuration of a printing system according to a modified example of the invention. As shown in FIG. 24, a configuration corresponding to the LUG P3a in the embodiment described above may be provided as an internal module (1D-LUT creating unit) of the PDV P3b. As shown in FIG. 25, a configuration corresponding to the LUG P3a in the embodiment described above may be executed in another computer 110. In this case, the computer 10 and the computer 110 are connected to each other through a predetermined communication interface CIF. A 1D-LUT generated in an LUG P3a of the computer 110 is transmitted to the computer 10 through the communication interface CIF. The communication interface CIF may be configured via the Internet. In this case, the computer 10 can perform the color conversion with reference to the 1D-LUT acquired from the computer 110 on the Internet. In addition, in the printer 20, the whole software configuration of P1 to P5 may be executed. Of course, even when a hardware configuration executing the same processes of those of the software configuration of P1 to P5 is added to the printer 20, the invention can be realized.

5-8. Modified Example 8

Figure 26:
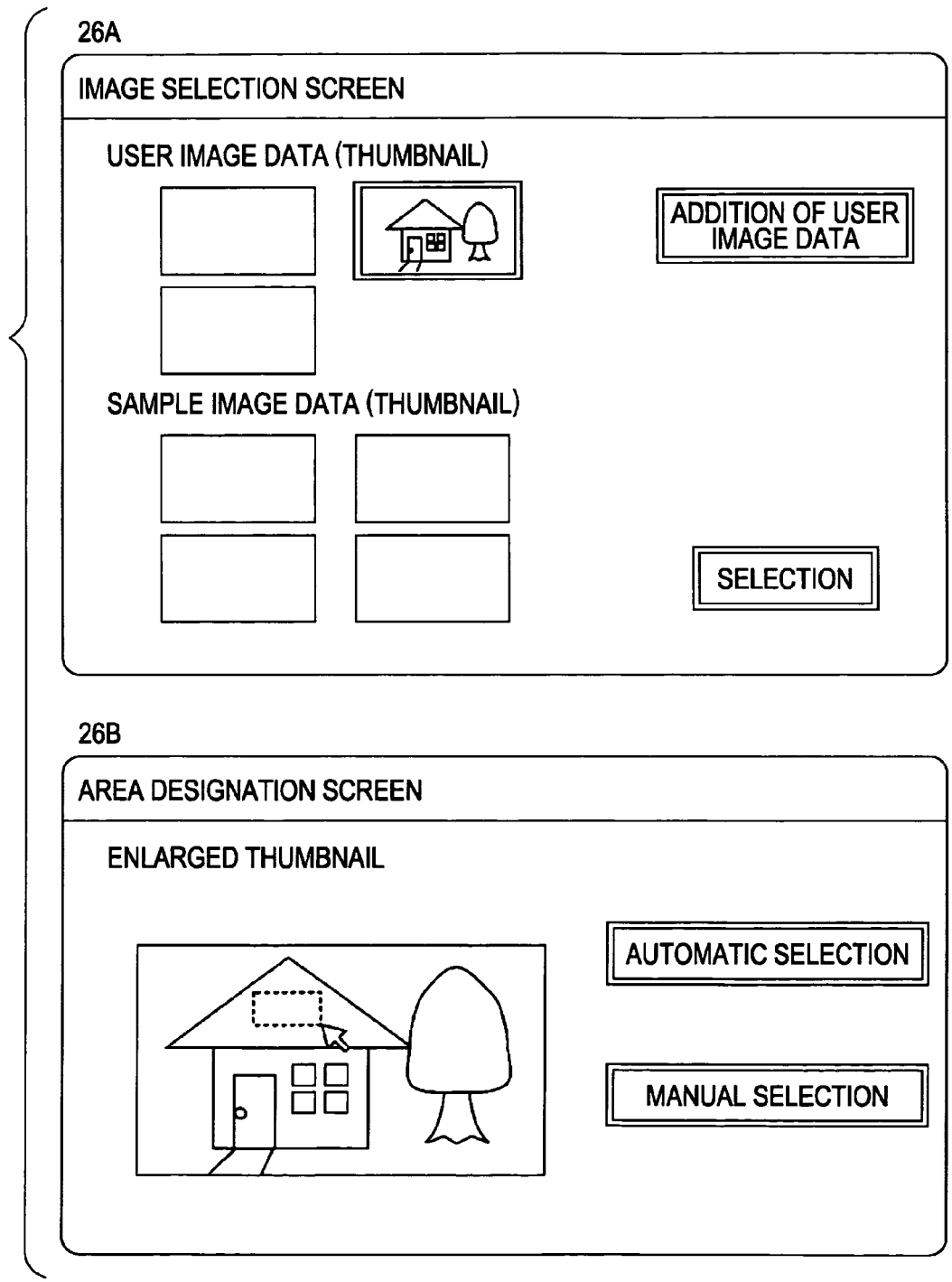
FIG. 26 is diagram illustrating UI screens according to a modified example.

FIGS. 26A and 26B are diagrams illustrating a UI screen (which is a display in Step S100) according to a modified example. In the embodiment described above, the target spectral reflectivity $R_t(\lambda)$ is actually measured and the index table obtained in correspondence with the target spectral reflectivity $R_t(\lambda)$ and index is created. However, an index table in which the plural indexes and the plural target spectral reflectivities $R_t(\lambda)$ are registered in advance may be created. In this modified example, an index table is prepared in advance in which a correspondence relation between an index given in each pigment manufactured by a pigment maker and the target spectral reflectivity $R_t(\lambda)$ obtained by measuring a surface applied with each pigment is registered. In this index table, the displaying RGB values are registered as in the embodiment described above. When the index table is created in advance, the APL P2 selects a pigment (index) desired to be reproduced in the sample chart SC in Step S100.

First, a list of thumbnails of plural sample image data and plural user image data is displayed, as shown in FIG. 26A. The sample image data are image data stored in advance in the HDD 14. The user image data are image data received from an image input apparatus such as a digital still camera and added by clicking an addition button for the user image data. Alternatively, image data downloaded from the Internet may be used as the user image data. Each of the thumbnails can be clicked by a mouse 50b and a frame is displayed in the last clicked thumbnail. A selection button is provided on the UI screen of FIG. 26A. Therefore, by clicking the selection button, user image data corresponding to the thumbnail of which the frame is displayed or the sample image data is selected.

When the selection is determined, the UI screen of FIG. 26B is displayed subsequently. An enlarged thumbnail of the determined user image data or the determined sample image data is displayed on the UI screen. The UI screen of FIG. 26B is provided with a manual selection button and an automatic selection button. When the manual selection button is clicked, a pointer of the mouse is displayed on the enlarged thumbnail, and designation of the left upper corner and the right lower corner in a designated area of a rectangular shape desired by a user is received by drag and drop. Then, the APL P2 inquires the RGB values for displaying pixels belonging to the designated rectangular area in the display 40 of the DDV P5. The DDV P5 can output the RGB values for displaying the pixels of the enlarged thumbnail to the display 40 and specify the RGB values of the pixels belonging to the designated area. When the RGB values of the pixels belonging to the designated area are obtained, the APL P2 averages the RGB values. Then, the average value thereof is set to a designated RGB value. Alternatively, when the automatic selection button is clicked, the APL P2 acquires the RGB values of all the pixels of the enlarged thumbnail from the DDV P5 and sets the most representative RGB value thereof as a designated RGB value. For example, a histogram of the RGB values of all the pixels of the enlarged thumbnail is created and the RGB value having the largest degree number may be set as the designated RGB value. When the designated RGB value is obtained in this manner, the displaying RGB value closest to the designated RGB value is retrieved from the index table. Here, an index in which a Euclidian distance is the smallest in an RGB space of the designated RGB value and the displaying RGB value is retrieved. The displaying RGB value having the smallest Euclidian distance with the designated RGB value is displayed as the most approximate RGB value. Next, each of the display RGB values (including the most approximate RGB value) is converted into an HSV value by a known conversion expression.

Figure 27:
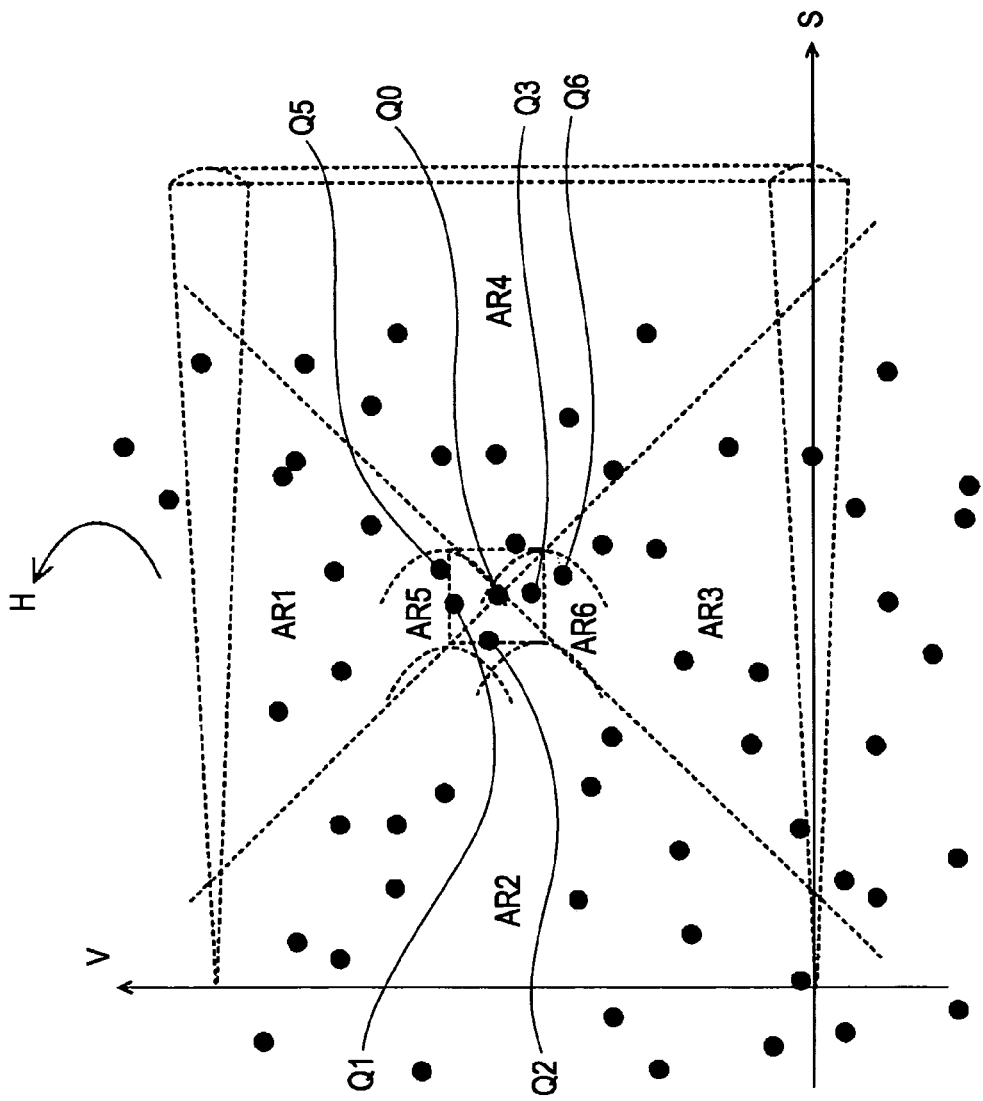
FIG. 27 is a diagram illustrating an HSV space.

FIG. 27 shows that the conversion of each of the displaying RGB values into each of HSV values is plotted in an HSV space. In the drawing, the HSV value into which the most approximate RGB value is converted is represented by a point Q0. In the HSV space, a sectional fan-shaped space where a hue angle (H value) of the HSV value (Q0) into which the most approximate RGB value is converted within ±5° is specified. That is, a space where the hue angle is approximated to the most approximate RGB value is specified. Next, two auxiliary axes SA intersecting a brightness axis (V axis) and a saturation axis (S axis) at 45° are generated and a first area AR1 to a fourth area AR4 divided by the auxiliary axes SA are defined. The first area AR1 has a characteristic in which the most approximate RGB value and the hue angle H is close to each other and brightness V is larger than the most approximate RGB value. The second area AR2 has a characteristic in which the most approximate RGB value and the hue angle H is close to each other and saturation S is slightly smaller than the most approximate RGB value. The third area AR3 has a characteristic in which the most approximate RGB value and the hue angle H is close to each other and the brightness V is smaller than the most approximate RGB value. The fourth area AR4 has a characteristic in which the most approximate RGB value and the hue angle H is close to each other and the saturation S is larger than the most approximate RGB value.

The displaying RGB value (which is a first approximate RGB value and is indicated by a point Q1 in the HSV space) belonging to the first area AR1 and corresponding to an HSV value having a brightness V closest to the brightness V of the point Q0 is retrieved from the index table. Likewise, the displaying RGB value (which is a third approximate RGB value and is indicated by a point Q3 in the HSV space) belonging to the third area AR3 and corresponding to the HSV value having the brightness V closest to the brightness V of the point Q0 is retrieved from the index table. In the first approximate RGB value, it can be said that the hue angle H is approximated to the most approximate RGB value and the brightness V is slightly larger than the most approximate RGB value. In contrast, in the third approximate RGB value, it can be said that the hue angle H is approximated to the most approximate RGB value and the brightness V is slightly small. Next, the displaying RGB value (which is a second approximate RGB value and is indicated by a point Q2 in the HSV space) belonging to the second area AR2 and corresponding to an HSV value having the saturation S closest to the saturation S of the point Q0 is retrieved from the index table. Likewise, the displaying RGB value (which is a fourth approximate RGB value and is indicated by a point Q4 in the HSV space) belonging to the fourth area AR4 and corresponding to the HSV value having the saturation S closest to the saturation S of the point Q0 is retrieved from the index table. In the second approximate RGB value, it can be said that the hue angle H is approximated to the most approximate RGB value and the saturation S is slightly smaller than the most approximate RGB value. In contrast, in the fourth approximate RGB value, it can be said that the hue angle H is approximated to the most approximate RGB value and the saturation S is slightly small.

As shown in FIG. 27, in the HSV space, a circular space where the brightness V and the saturation S of the HSV value (Q0) into which the most approximate RGB value is converted become the brightness V and the saturation S within ±5° is specified. That is, a space where the brightness V and the saturation S are approximated to the most approximate RGB value is specified. Next, an area where the hue angle H is larger than the HSV value into which the most approximate RGB value is converted in the circular space is set to a fifth area AR5 and an area where the hue angle H is smaller than the HSV value is set to a sixth area AR6. In addition, the displaying RGB value (which is a fifth approximate RGB value and is indicated by a point Q5 in the HSV space) belonging to the fifth area AR5 and corresponding to an HSV value having the hue angle H closest to the point Q0 is retrieved from the index table. Likewise, the displaying RGB value (which is a sixth approximate RGB value and is indicated by a point Q6 in the HSV space) belonging to the sixth area AR6 and corresponding to the HSV value having the hue angle H closest to the point Q0 is retrieved from the index table. In the fifth approximate RGB value, it can be said that the brightness V and the saturation S are approximated to the most approximate RGB value and the hue angle H is slightly larger than the most approximate RGB value. In contrast, in the sixth approximate RGB value, it can be said that the brightness V and the saturation S are approximated to the most approximate RGB value and the hue angle H is slightly smaller than the most approximate RGB value. In this way, a subsequent UI screen is displayed, when the most approximate RGB value and the first to sixth approximate RGB values can be specified.

Figure 28:
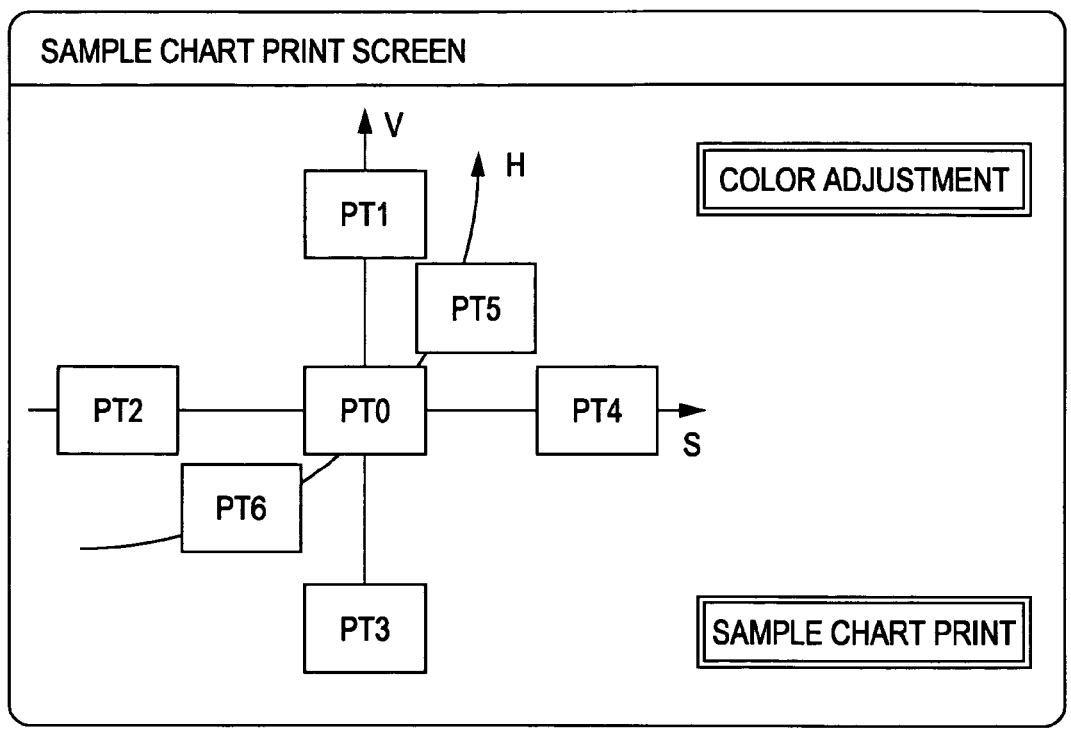
FIG. 28 is a diagram illustrating a UI screen according to a modified example.

FIG. 28 is a diagram illustrating the UI screen which is displayed subsequently. On the UI screen, the HSV space is partly displayed and the HSV axes are each displayed. An attention display patch PT0 having a rectangular shape colored with the most approximate RGB value is displayed at an intersection point of these axes. A first display patch PT1 having a rectangular shape colored entirely with the first approximate RGB value is displayed on a side having the large brightness V on the V axis. In addition, a third display patch PT3 having a rectangular shape colored entirely with the third approximate RGB value is displayed on a side having the small brightness V on the V axis. A fourth display patch PT4 having a rectangular shape colored entirely with the fourth approximate RGB value is displayed on a side having the large brightness S on the S axis. In addition, a second display patch PT2 having rectangular shape colored entirely with the second approximate RGB value is displayed on a side having the small brightness S on the S axis. Moreover, a fifth display patch PT5 having rectangular shape colored entirely with the fifth approximate RGB value is displayed on a side having the large hue angle H on the H axis. In addition, a sixth display patch PT6 having rectangular shape colored entirely with the sixth approximate RGB value is displayed on a side having the small hue angle H on the H axis.

The attention display patch PT0 is displayed by approximation to a designated RGB value designated by a user among the displaying RGB values registered in the index table. That is, the attention display patch represents a color of a pigment which is the most approximate to the designated RGB value designated by the user among the indexes (pigments) registered in the index table. In contrast, the first display patch PT1 to the sixth display patch PT6 can be said to express a color of a pigment of which the hue H, the brightness V, and the saturation S are slightly different from those of the most approximate RGB value, as a pigment approximate to the designated RGB value (the most approximate RGB value) designated by the user among the indexes (pigments) registered in the index table. In this way, it is possible to view the color of the approximate pigment for the designated RGB value designated by the user and a color of a pigment approximate thereto.

The UI screen in FIG. 28 is provided with an adjustment button and a sample chart print button. When the adjustment button is clicked, the APL P2 detects an operation of the mouse 50b. Even though not illustrated, the mouse 50b has a wheel in addition to a click button. After the adjustment button is clicked, the APL P2 detects a movement direction of the mouse 50b and rotation of the wheel until operation of a subsequent click button. In addition, the UI screen in FIG. 28 is updated with the movement direction of the mouse 50b and the rotation of the wheel, as described below.

When the mouse 50b moves in an upward (inward) direction by a predetermined distance, the most approximate RGB value is replaced by the present first approximate RGB value. After the most approximate RGB value is replaced by the present first approximate RGB value, a new first approximate RGB value to a new sixth approximate RGB value are calculated in the above-described order. In addition, on the basis of the new most approximate RGB value and the new first approximate RGB value to the new sixth approximate RGB value, the UI screen in FIG. 28 is updated so as to display the attention display patch PT0 and the first display patch PT1 to the sixth display patch PT6. In this way, the attention display patch PT0 and the first display patch PT1 to the sixth display patch PT6 are shifted to colors represented by the pigments having high brightness. On the other hand, when the mouse 50b moves in a downward (frontward) direction by a predetermined distance, the most approximate RGB value is replaced by the present third approximate RGB value, and then the UI screen in FIG. 28 is updated so as to display a new attention display patch PT0 and new first display patch PT1 to new sixth display patch PT6. In this way, the attention display patch PT0 and the first display patch PT1 to the sixth display-patch PT6 are shifted to colors represented by the pigments having low brightness.

When the mouse 50b moves in a right direction by a predetermined distance, the most approximate RGB value is replaced by the present fourth approximate RGB value. Subsequently, the UI screen in FIG. 28 is updated so as to display a new attention display patch PT0 and a new first display patch PT1 to a new sixth display patch PT6. Likewise, when the mouse 50b moves in a left direction by a predetermined distance, the most approximate RGB value is replaced by the present second approximate RGB value. Subsequently, the UI screen in FIG. 28 is updated so as to display a new attention display patch PT0 and a new first display patch PT1 to a new sixth display patch PT6. When the wheel of the mouse 50b rotates in an inward direction by a predetermined amount, the most approximate RGB value is replaced by the present fifth approximate RGB value. Subsequently, the UI screen in FIG. 28 is updated so as to display a new attention display patch PT0 and a new first display patch PT1 to a new sixth display patch PT6. When the wheel of the mouse sob rotates in a frontward direction by a predetermined amount, the most approximate RGB value is replaced by the present sixth approximate RGB value. Subsequently, the UI screen in FIG. 28 is updated so as to display a new attention display patch PT0 and a new first display patch PT1 to a new sixth display patch PT6.

In this way, it is possible to change a color of the attention display patch PT0 into a side of the first display patch PT1 to the sixth display patch PT6. That is, the color of the attention display patch PT0 can be shifted toward a high/low brightness side, a high/low saturation side, and a large/small hue angle within the displaying RGB values registered in the index table. In other words, the color of the attention display patch PT0 is transmitted along the H axis, the S axis, and the V axis by operation of the mouse 50b. In addition, the color of the attention display patch PT0 can be adjusted sensuously. Since the attention display patch PT0 and the first display patch PT1 to the sixth display patch PT6 are displayed on the basis of the displaying RGB values retrieved from the index table, the color expressed by one pigment thereof is displayed. When the click button of the mouse 50b is clicked, the updating of the UI screen in FIG. 28 performed by operation of the mouse 50b ends. In this way, by displaying the attention display patch PT0 perceived by the user, it is possible to end the updating of the UI screen in FIG. 28.

When the sample chart print button is clicked on the UI screen in FIG. 28, the process proceeds to Step S170 of FIG. 3 to generate print data. Here, basically, the print data PD used to print the UI screen of FIG. 28 is generated. That is, the attention display patch PT0 and the first display patch PT1 to the sixth display patch PT6 are configured to be printed. Here, RGB values of pixels of the print data PD and pixels of an area other than the areas corresponding to the attention display patch PT0 and the first display patch PT1 to the sixth display patch PT6 are stored. On the other hand, pixels of the areas corresponding to the attention display patch PT0 and the first display patch PT1 to the sixth display patch PT6 can correspond to the displaying RGB values representing the attention display patch PT0 and the first display patch PT1 to the sixth display patch PT6 in the index table, and the indexes are stored instead of the RGB values. In this way, for reproducing the target spectral reflectivity $R_t(\lambda)$ of a pigment corresponding to each of the indexes, printing is performed on the attention display patch PT0 and the first display patch PT1 to the sixth display patch PT6.

In the sample chart SC printed in this manner, it is possible to print the attention display patch PT0 reproducing the spectral reflectivity of a pigment representing a color close to a color of which an area is designated in the enlarged thumbnail by the user. In addition, it is possible to print the first display patch PT1 to the sixth display patch PT6 reproducing the spectral reflectivity of a pigment representing a color close to the attention display patch PT0. Even though the reproduction result of the attention display patch PT0 is different from an user's intention, it is possible to select a desired pigment among the first display patch PT1 to the sixth display patch PT6 representing the color close to the attention display patch PT0.

CROSS-REFERENCE TO RELATED APPLICATIONS

The entire disclosure of Japanese Patent Application No. 2007-330783 filed Dec. 21, 2007, and Japanese Patent Application No. 2008-306355, filed Dec. 1, 2008, are expressly incorporated by reference herein.

What is claimed is:

1. A printing control device which designates a color material amount set, which is a combination of use amounts of plural color materials, to a printing apparatus and performs printing on the basis of the color material amount set, when permitting the printing apparatus to perform the printing by attaching the plural color materials to a print medium, the printing control device comprising:

- a target spectral reflectivity acquiring unit which acquires spectral reflectivity of a target as an acquired target spectral reflectivity; and
- a printing control unit which acquires a color material amount set corresponding to the acquired target spectral reflectivity with reference to a lookup table, the lookup table defining a correspondence relation between a plurality of color material amount sets and a plurality of target spectral reflectivities, and which designates the acquired color material amount set to the printing apparatus to perform the printing,
- wherein in the lookup table, a correspondence relation between a particular color material amount set and a particular target spectral reflectivity is defined based on a degree of approximation between the particular target spectral reflectivity and the spectral reflectivity reproduced on the print medium when the particular color material amount set is designated to the printing apparatus to perform the printing, said degree of approximation being adjusted by a wavelength-dependent weighting.

2. The printing control device according to claim 1, wherein the weighting is set on the basis of a spectral sensitivity characteristic of human eyes.

3. The printing control device according to claim 2, wherein the weighting is set on the basis of linear combination of color-matching functions corresponding to tristimulus.

4. The printing control device according to claim 1, wherein the weighting is set on the basis of the acquired target spectral reflectivity.

5. The printing control device according to claim 1, wherein the weighting is set on the basis of a spectral energy distribution of a predetermined light source.

6. The printing control device according to claim 5, wherein the weighting is set on the basis of linear combination of spectral energy distributions of plural light sources.

7. A printing system which includes a printing apparatus that performs printing by attaching plural color materials to a print medium and a printing control device designating a color material amount set, which is a combination of use amounts of plural color materials, to the printing apparatus and permitting the printing apparatus to perform printing based on the designated color material amount set, the printing system comprising:

- a target spectral reflectivity acquiring unit which acquires spectral reflectivity of a target as an acquired target spectral reflectivity; and
- a printing control unit which acquires a color material amount set corresponding to the acquired target spectral reflectivity with reference to a lookup table, the lookup table defining a correspondence relation between a plurality of color material amount sets and a plurality of target spectral reflectivities, and which designates the acquired color material amount set to the printing apparatus to perform the printing,
- wherein in the lookup table, a correspondence relation between a particular color material amount set and a particular target spectral reflectivity is defined based on a degree of approximation between the particular target spectral reflectivity and the spectral reflectivity reproduced on the print medium when the particular color material amount set is designated to the printing apparatus to perform the printing, said degree of approximation being adjusted by a wavelength-dependent weighting.

8. A non-transitory computer-readable storage medium having a program stored thereon, the program being configured to cause a computer to execute a function of designating a color material amount set, which is a combination of use amounts of plural color materials, to a printing apparatus to perform printing on the basis of the color material amount set, when permitting the printing apparatus to perform the printing by attaching the plural color materials to a print medium, the function of designating a color material amount set comprising:

- a target spectral reflectivity acquiring function which acquires spectral reflectivity of a target as an acquired target spectral reflectivity; and
- a printing control function which acquires a color material amount set corresponding to the acquired target spectral reflectivity with reference to a lookup table, the lookup table defining a correspondence relation between a plurality of color material amount sets and a plurality of target spectral reflectivities, and which designates the acquired color material amount set to the printing apparatus to perform the printing,
- wherein in the lookup table, a correspondence relation between a particular color material amount set and a particular target spectral reflectivity is defined based on a degree of approximation between the particular target spectral reflectivity and the spectral reflectivity reproduced on the print medium when the particular color material amount set is designated to the printing apparatus to perform the printing, said degree of approximation being adjusted by a wavelength-dependent weighting.

* * * * *